United States Patent [19]
Kita

[11] Patent Number: 5,960,367
[45] Date of Patent: Sep. 28, 1999

[54] INCOMING CALLING SYSTEM

[75] Inventor: Kazunori Kita, Tokyo, Japan

[73] Assignee: Casio Computer Co., Ltd., Tokyo, Japan

[21] Appl. No.: 08/849,381

[22] PCT Filed: Sep. 17, 1996

[86] PCT No.: PCT/JP96/02648

§ 371 Date: May 15, 1997

§ 102(e) Date: May 15, 1997

[87] PCT Pub. No.: WO97/11532

PCT Pub. Date: Mar. 27, 1997

[30] Foreign Application Priority Data

Sep. 18, 1995 [JP] Japan ..................................... 7-263465

[51] Int. Cl.$^6$ ................. H04B 7/00; H04B 1/38
[52] U.S. Cl. .............. 455/567; 455/66; 455/96; 455/11.1
[58] Field of Search .................. 455/11.1, 413, 455/66, 550, 88, 73, 556–559, 563, 566–567, 575, 90, 128, 344–351, 31.1–32.1, 38.4–38.5, 38.1–38.2, 414; 340/311.1, 825.44

[56] References Cited

U.S. PATENT DOCUMENTS

| 4,803,487 | 2/1989 | Willard et al. ...................... 455/11.1 |
| 5,722,071 | 2/1998 | Berg et al. ........................... 455/426 |

FOREIGN PATENT DOCUMENTS

| 0 263 666 A2 | 4/1988 | European Pat. Off. . |
| 0 536 970 A2 | 4/1993 | European Pat. Off. . |
| 0 549 926 A1 | 7/1993 | European Pat. Off. . |

OTHER PUBLICATIONS

Patent Abstracts of Japan vol. 96, No. 2, & JP 8–047049 (Optec Dai Ichi Denko Co., Ltd.) Feb. 16, 1996.
Patent Abstracts of Japan & JP 8–065745 (Sankyo Seiki Mfg. Co., Ltd.) Mar. 8, 1996.
Patent Abstracts of Japan vol. 16, No. 517, Oct. 23, 1992 & JP 4–192945 (Murata Mach Ltd.) Jul. 13, 1992.

Primary Examiner—Reinhard J. Eisenzopf
Assistant Examiner—Edan Orgad
Attorney, Agent, or Firm—Frishauf, Holtz, Goodman, Langer & Chick, P.C.

[57] ABSTRACT

An incoming calling system of the present invention purposes to securely notify the user of the incoming to a radio portable terminal of a mobile communication unit or the like without disturbing others and decrease the probability of erroneous notification. Therefore, an incoming notification signal transmitter (24) for notifying the user of incoming can detect an incoming tone by inserting a jack into and connecting it with an earphone-microphone terminal (23) provided for a portable telephone (21) side and moreover, an incoming notification signal transmitter (24) is set to and supported by portable telephone (21). When portable telephone (21) receives an incoming call signal according to incoming calling from a base station (22), it generates a speech signal of an incoming tone and the speech signal is input to the incoming notification signal transmitter (24) through the earphone-microphone terminal (23) to detect incoming. The incoming notification signal transmitter (24) is constituted so as to generate incoming notification signal (25), transmit the signal to a card-type incoming notification signal receiver (26) or a wrist-type incoming notification signal receiver (27) by radio, and notify the user of incoming at portable telephone (21) side by vibration or a sound output buzzer.

11 Claims, 21 Drawing Sheets

FIG.9E fc 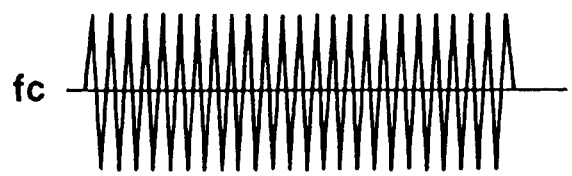

INCOMING CALLING SYSTEM

TECHNICAL FIELD

The present invention relates to an incoming calling system, more particularly to an incoming calling system for notifying the terminal user of incoming to a telephone terminal or portable radio terminal by a compact incoming calling unit.

BACKGROUND ART

A car telephone, portable telephone, and moreover a digital cordless telephone (PHS: Personal Handy Phone System) allowing a slave terminal of a home cordless telephone to be also used as a portable telephone outdoors have practically been used in recent years and downsizing or personalizing of a radiotelephone is rapidly progressed. Moreover, downsizing of a pager (individual selective calling system) is progressed while it is also considered to incorporate telephone functions and pager functions into an electronic organizer or portable information terminal.

However, though these various pieces of electronic equipment are downsized, each of them is still bulky in a pocket and therefore, it is frequently put in a suitcase or bag to carry. For this reason, an incoming ringing tone of a portable telephone or pager becomes difficult to hear. Particularly, a contact cannot frequently be received because the user does not sense incoming during noises.

Moreover, as described above, a portable telephone for notifying the user of incoming by an incoming ringing tone cannot adequately display the feature that the portable phone can be used anywhere because an incoming ringing tone disturbs others when he is present in a streetcar, airplane, or public place such as a meeting hall.

Products are already manufactured which makes it possible for the user to confirm a communicating destination or a matter of business even after he fails to hear an incoming ringing tone by adding an automatic answering and recording function to a portable telephone, makes it possible to notify the user by a portable telephone provided with an incoming notifying function using vibration (vibrator call) without disturbing others by having the telephone in his pocket, and notifies the user of incoming without disturbing others even if he has a master portable telephone in his suitcase or bag by using a compact portable incoming calling unit for detecting a signal output from a slave portable telephone by wireless and notifying him through vibration or the like.

However, a conventional portable telephone terminal has the problems that the cost increases by adding an automatic answering and recording function to a portable telephone and moreover, it is impossible to prevent the user from failing to hear an incoming ringing tone even if he can confirm a communicating destination or a matter of business later.

Moreover, it is necessary for the user to always carry a product whose portable telephone terminal is provided with an incoming notifying function through vibration in his breast pocket or the like because incoming is notified to him through vibration though the incoming does not disturb others. However, even downsizing of a portable telephone is rapidly progressed, there are problems that it is troublesome and uncomfortable for the user to live by always having the portable telephone in his breast pocket or the like because of waiting reception.

Furthermore, when a call-in signal (incoming calling signal) is output from a base station through radio waves, an incoming calling unit for a portable telephone constituted with a separate case receives radio waves of a link channel establishment request signal, burst signal, or incoming calling response signal transmitted from a portable telephone terminal nearby the terminal by responding to the incoming calling signal and notifies the user of incoming through a vibration alarm obtained by eccentrically setting a weight to the rotary shaft of a motor.

However, because the above theory detects radio waves output from a portable telephone and moreover responds to radio waves output from a portable telephone terminal at the time of not only incoming but also speech, calling, or position entry communication when the terminal moves exceeding a service area or cell of a base station, it has a problem of a high possibility of erroneous notification.

Moreover, when a near portable telephone terminal receives incoming or speech is carried out, a problem occurs that an incoming calling unit receives radio waves and output an erroneous notification similarly to the above case.

DISCLOSURE OF THE INVENTION

The present invention is made to solve the above problems and its object is to provide an incoming calling system capable of securely notifying the user of incoming to a radio portable terminal of a mobile communication equipment without disturbing others and outputting less erroneous notification.

To achieve the above object, an incoming calling system of the present invention comprises an incoming notification signal transmitter having an incoming detection unit connected to a telephone terminal to detect the incoming to the telephone terminal and a wireless transmission unit for transmitting an incoming notification signal by wireless when the incoming is detected by the detection unit and an incoming notification signal receiver having a wireless reception unit for receiving the incoming notification signal transmitted by the incoming notification signal transmitter and notification unit for notifying that the signal is received by the wireless reception unit, in which the incoming notification signal transmitter and the incoming notification signal receiver are constituted with a separate case respectively.

Therefore, because the incoming notification signal transmitter and the incoming notification signal receiver are constituted with a separate case respectively, it is possible to recognize incoming by only having a compact incoming notification signal receiver without always carrying a radio portable terminal. Moreover, because the incoming notification signal transmitter is directly connected to the radio portable terminal, it is possible to securely detect the incoming to the radio portable terminal and transmits an incoming notification signal to the incoming notification signal receiver in accordance with the incoming detection. Therefore, secure incoming notification free from erroneous notification can be realized.

BRIEF DESCRIPTION OF THE DRAWINGS

FIGS. 9A to 9F are waveform diagrams showing output signal waveforms of various sections;

7

Figure 14:
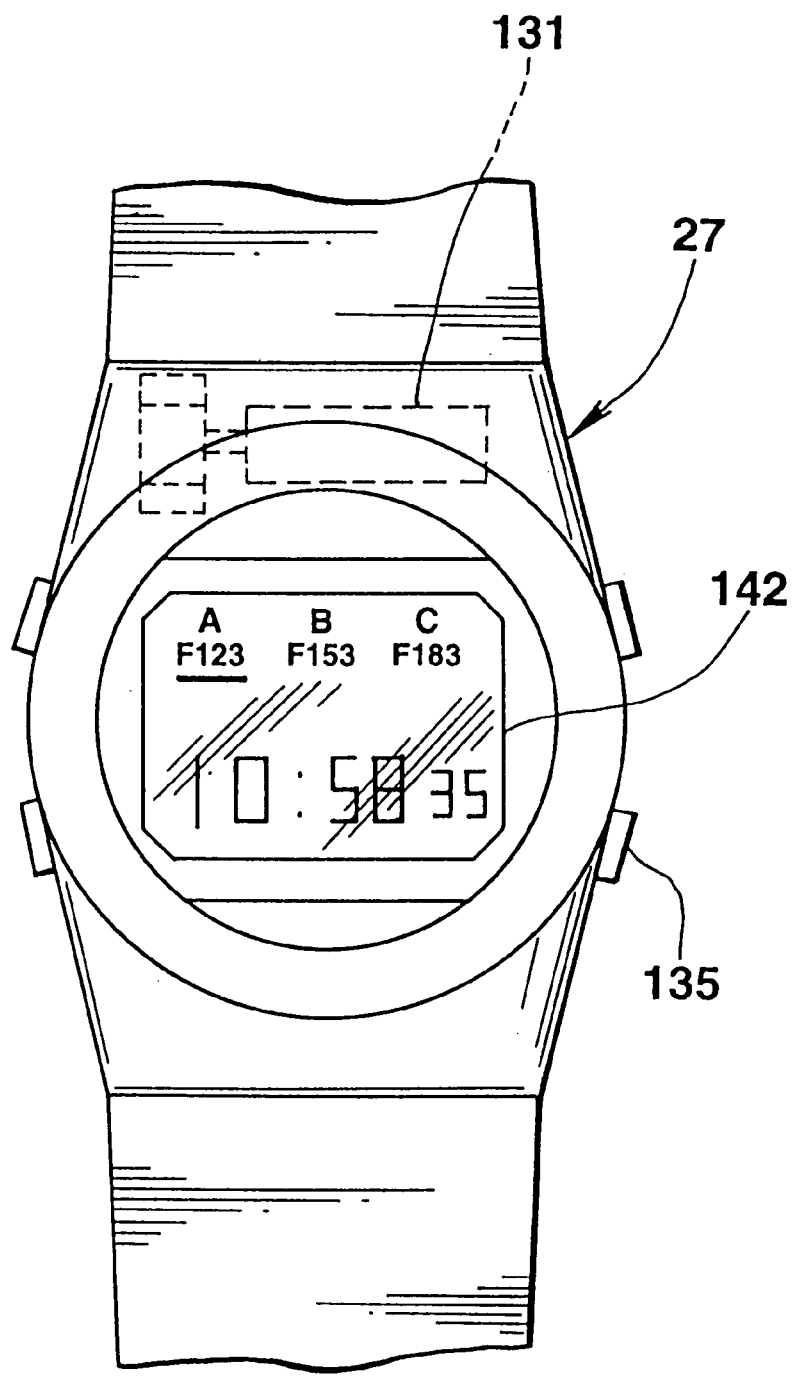
Figure 15:
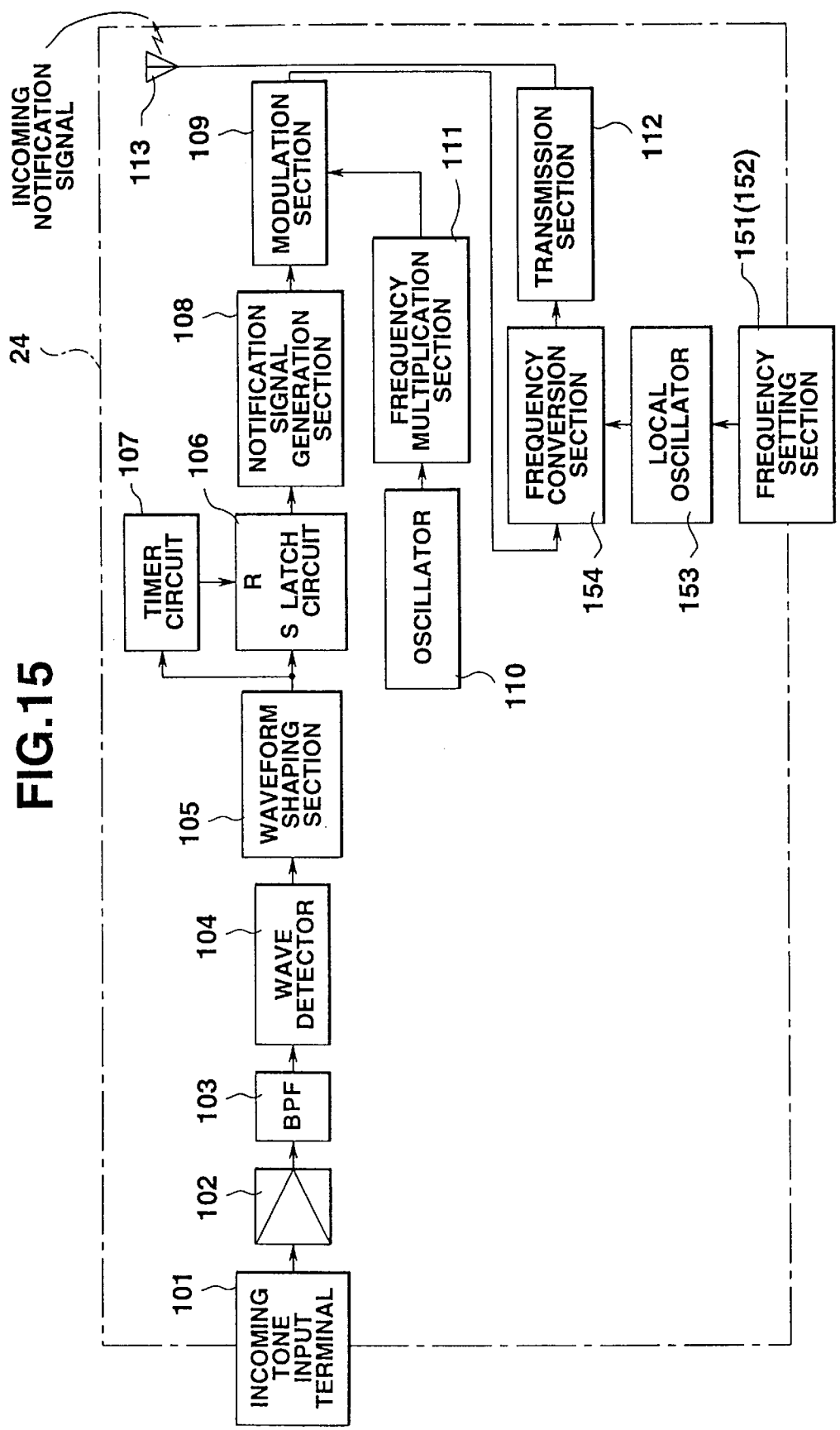
Figure 16:
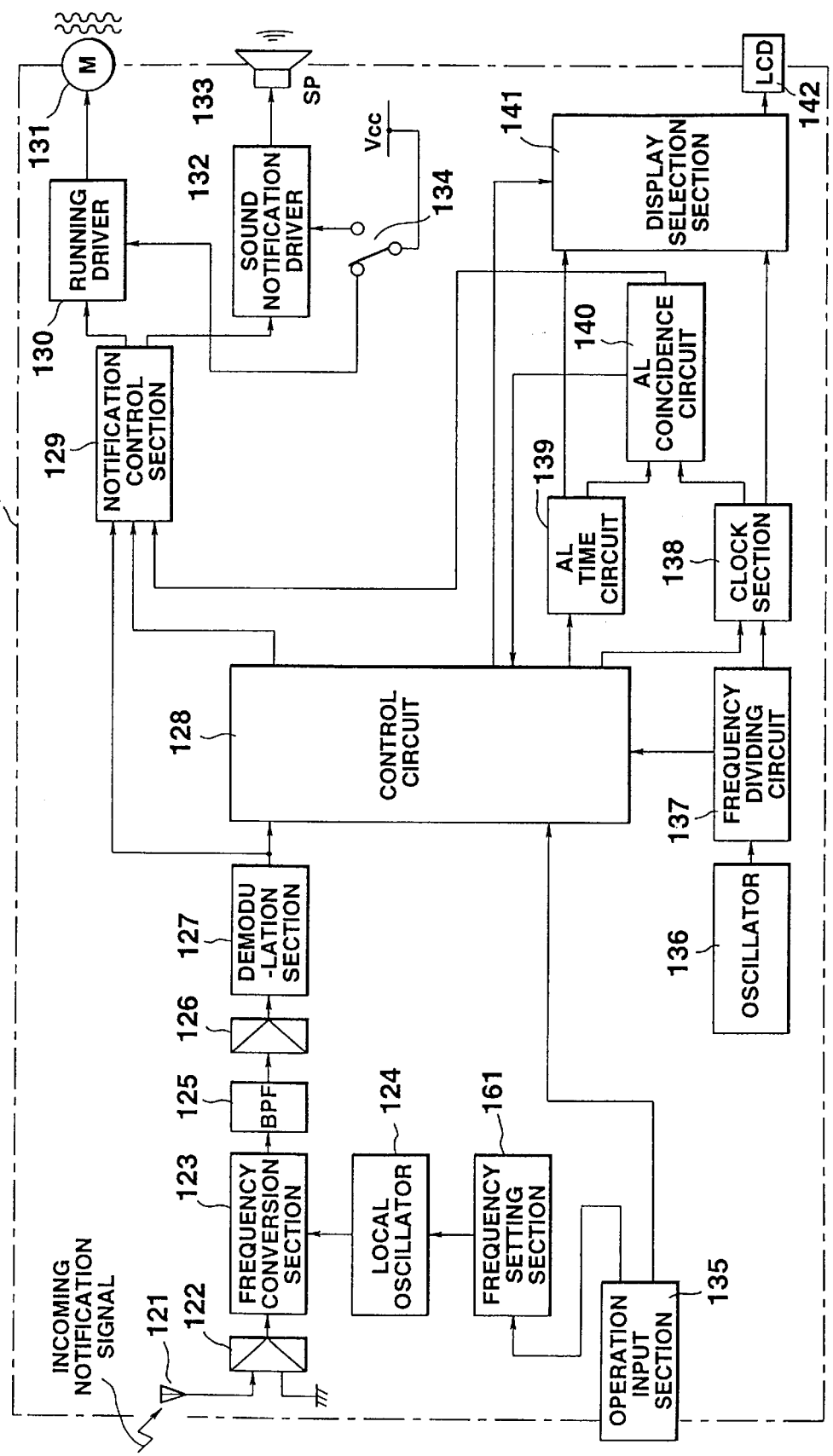
Figure 17A:
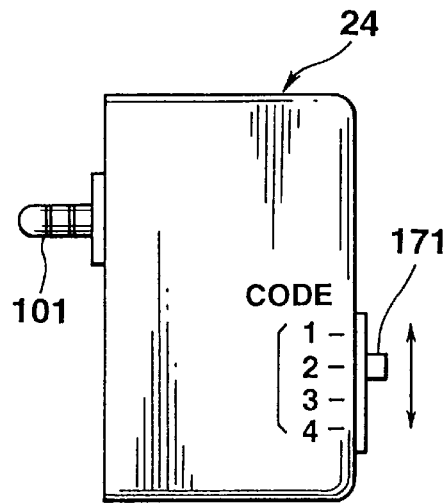
Figure 17B:
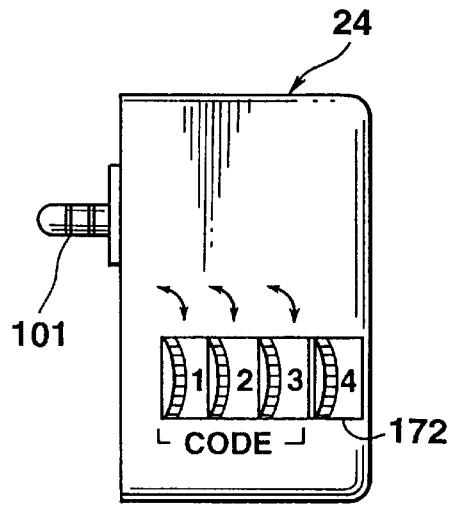
Figure 18:
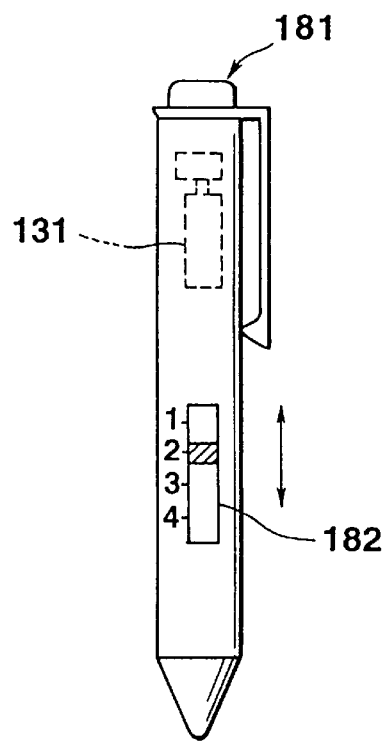
Figure 19:
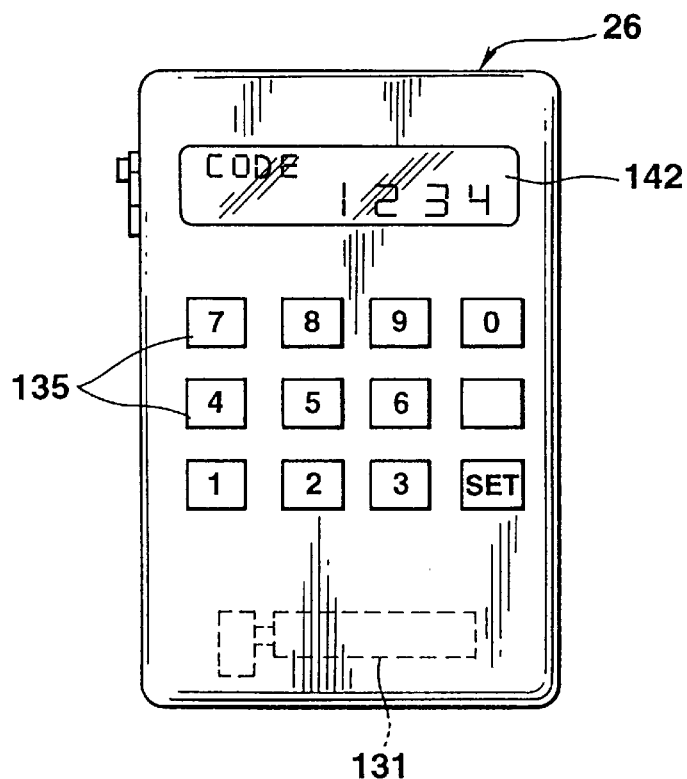
Figure 20:
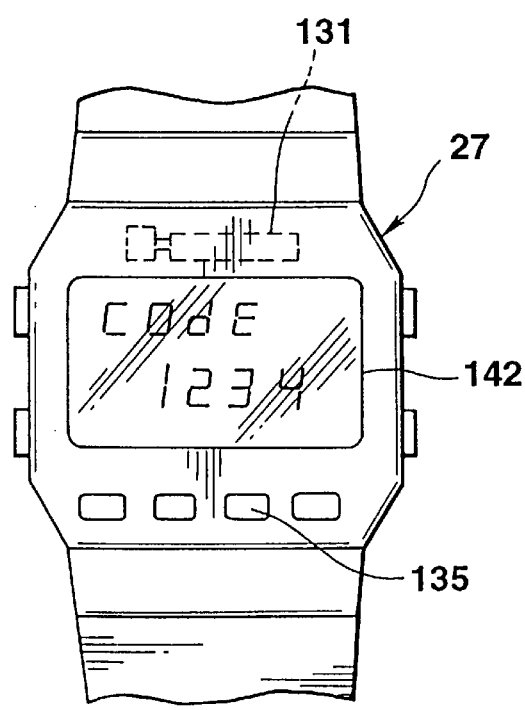
Figure 21:
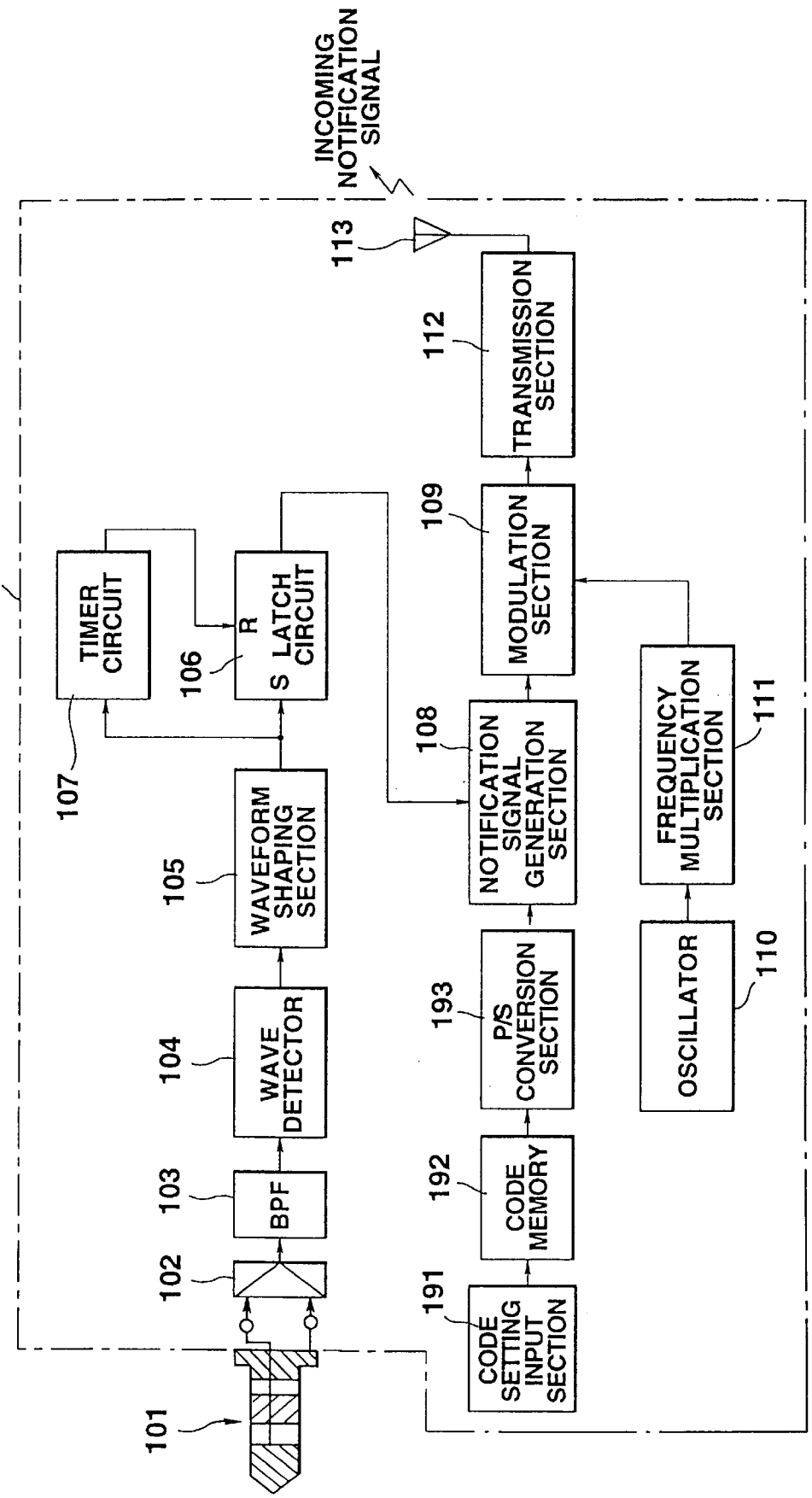
Figure 22:
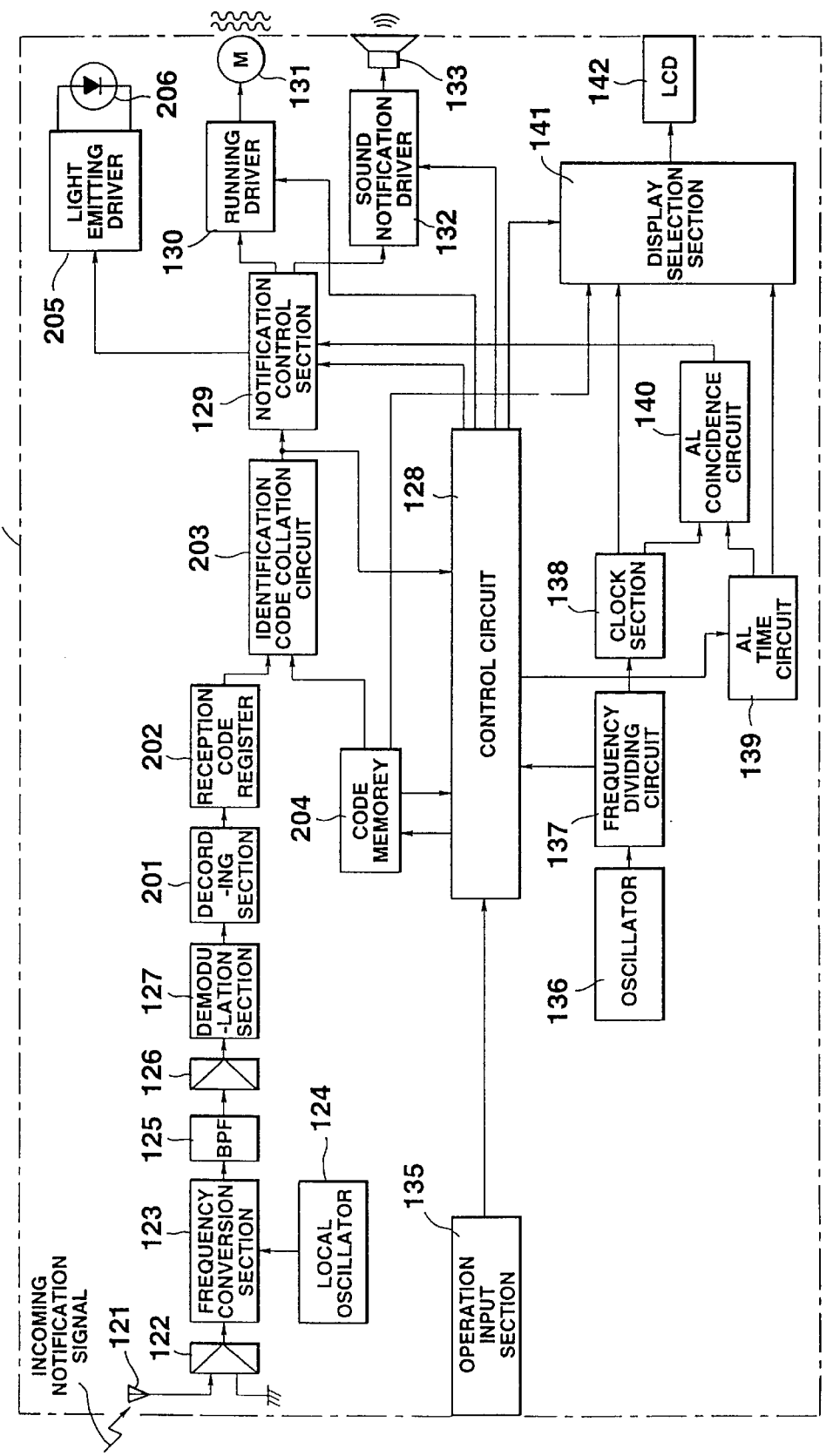
Figure 23:
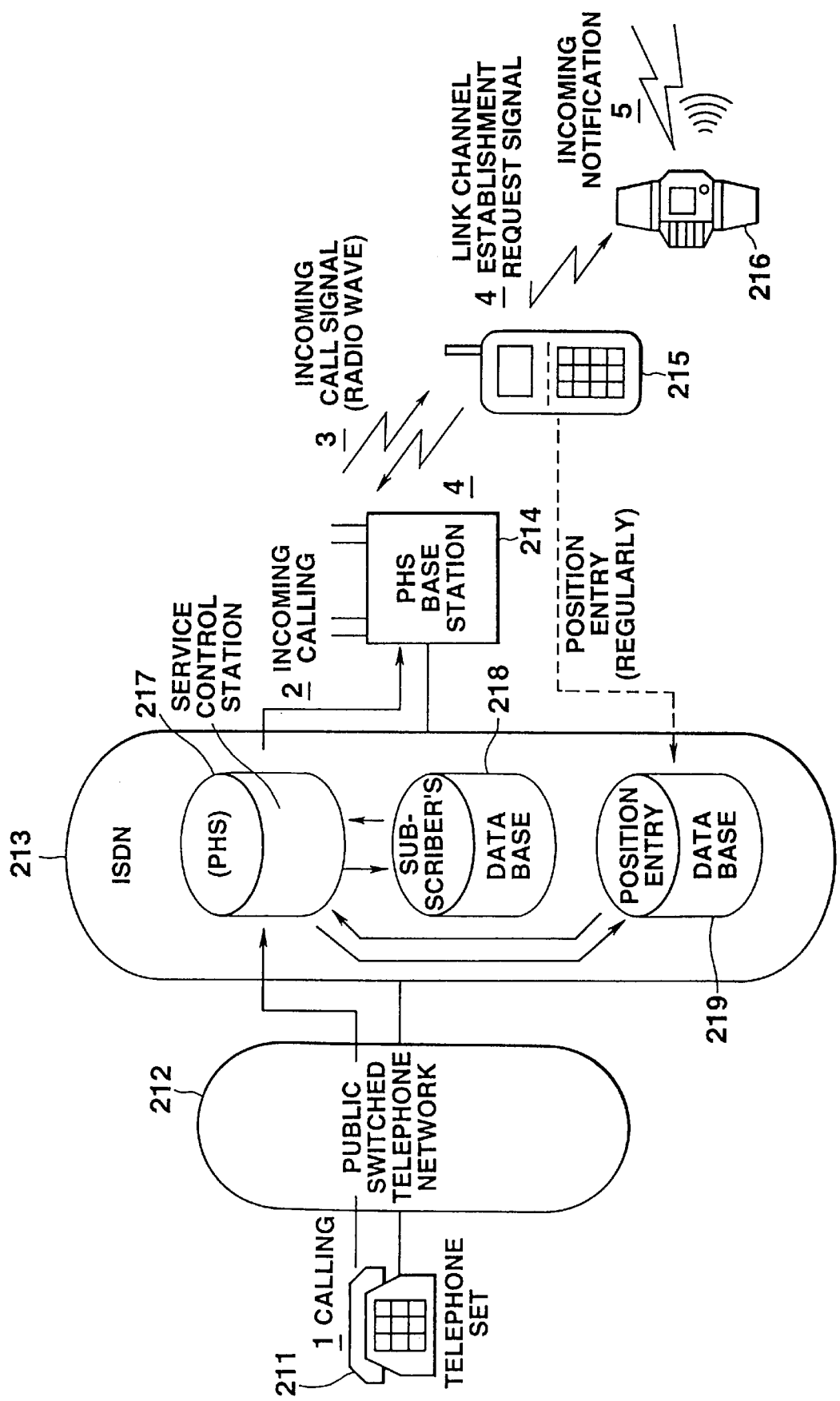
Figure 24:
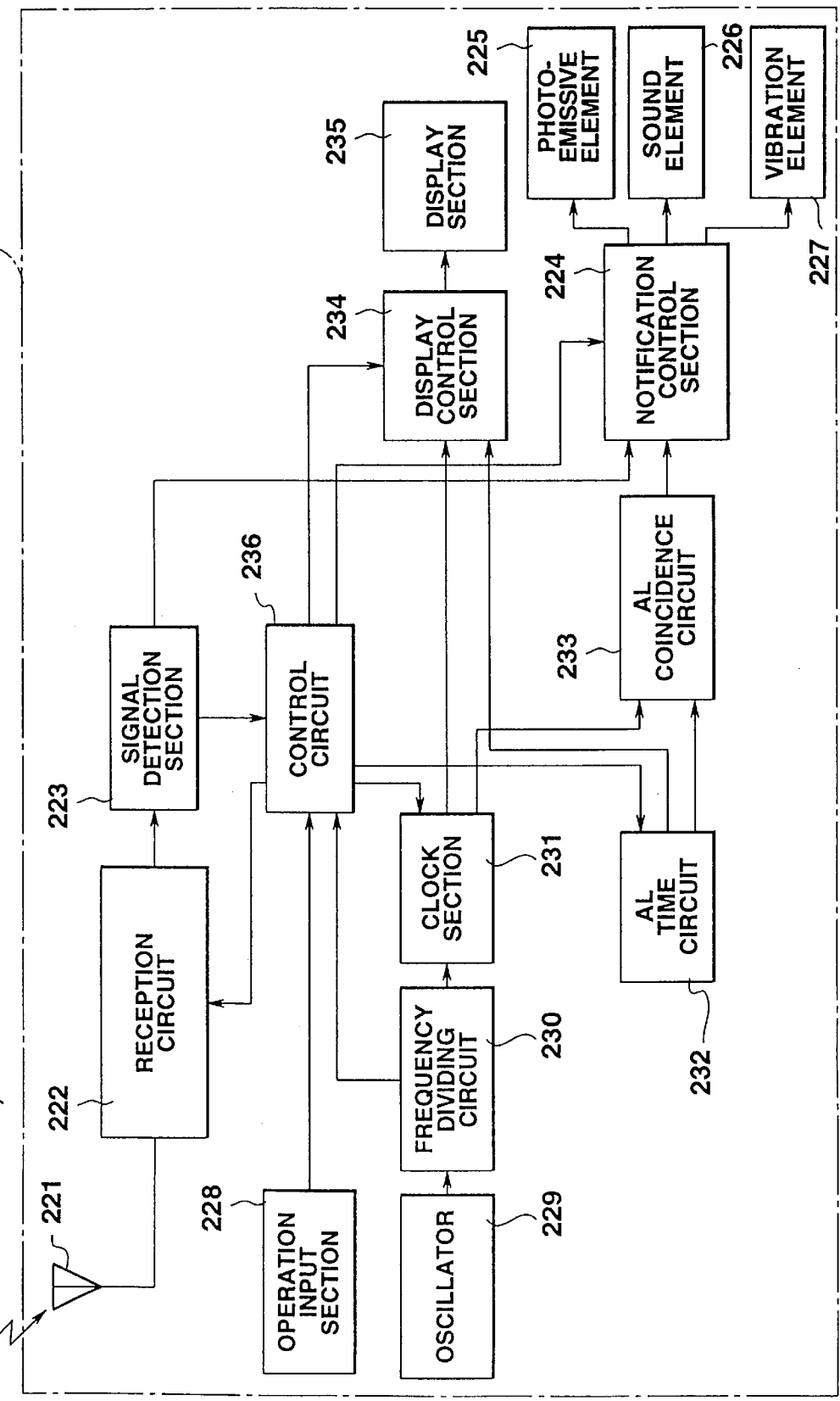
Figure 25:
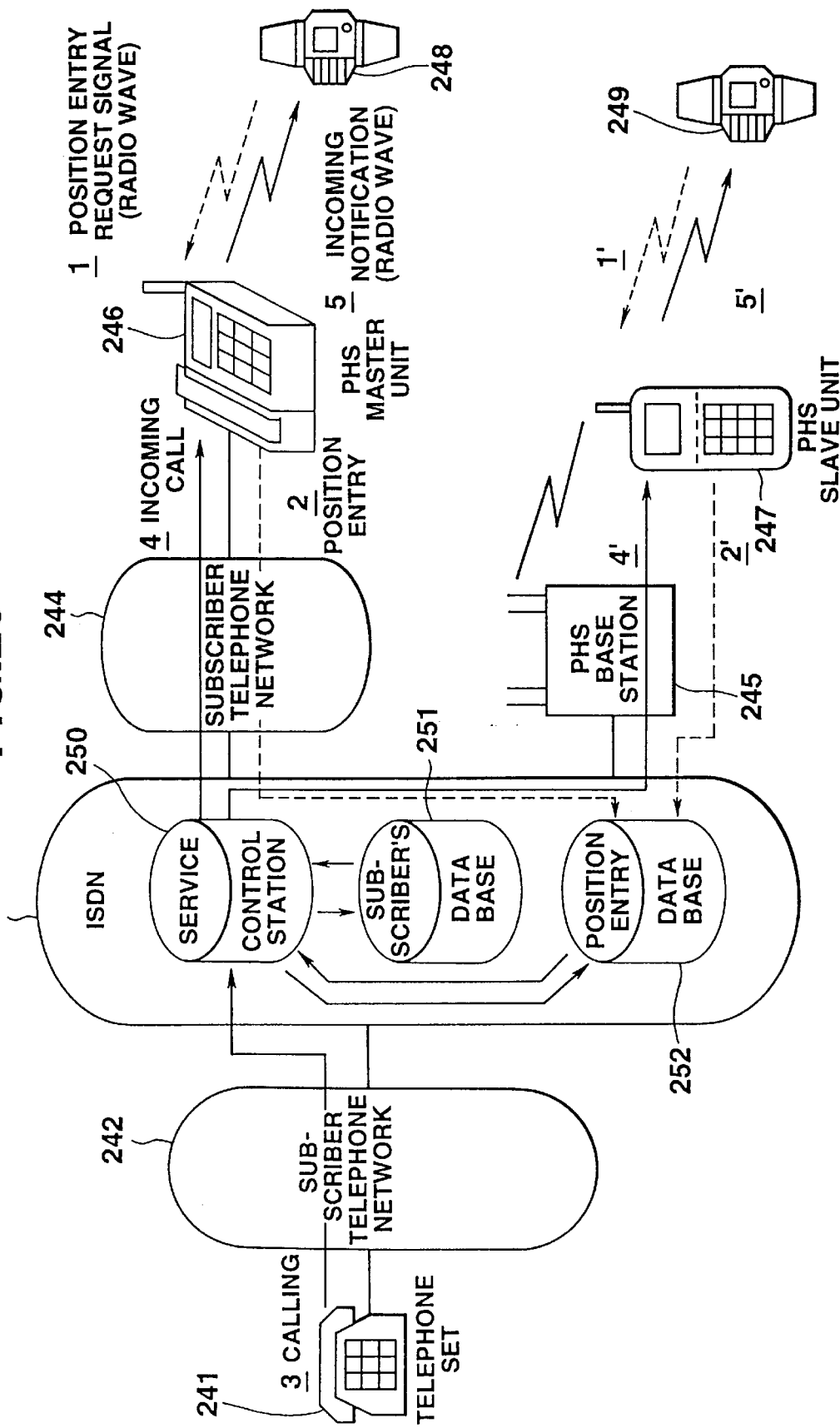
Figure 26:
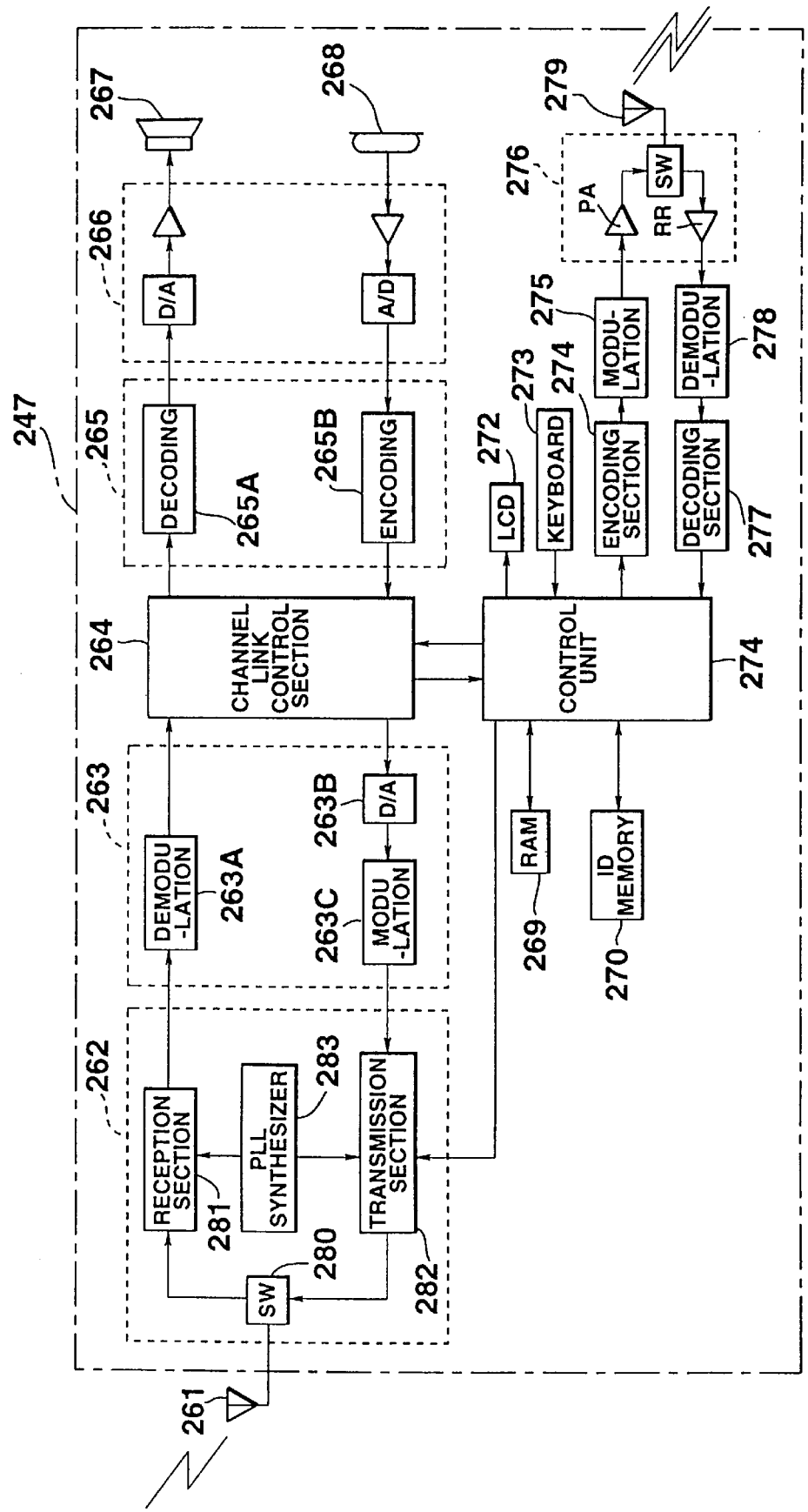

FIG. 14 is a full view of a wrist-type incoming notification signal receiver of the second embodiment;

FIG. 15 is a circuit block diagram of a wrist-type incoming notification signal transmitter of the second embodiment;

FIG. 16 is a circuit block diagram of the wrist-type incoming notification signal receiver of the second embodiment;

FIGS. 17A and 17B are full views of a pen-type incoming notification signal receiver of a third embodiment;

FIG. 18 is a full view of a card-type incoming notification signal receiver of the third embodiment;

FIG. 19 is a full view of a card-type incoming notification signal receiver of the third embodiment;

FIG. 20 is a full view of a wrist-type incoming notification signal receiver of the third embodiment;

FIG. 21 is a circuit block diagram of the incoming notification signal transmitter of the third embodiment;

FIG. 22 is a circuit block diagram of the wrist-type incoming notification signal receiver of the third embodiment;

FIG. 23 is a system diagram for explaining a processing flow at the time of incoming calling of a PHS cordless telephone;

FIG. 24 is a circuit block diagram of a wrist-type incoming calling system of a fourth embodiment;

FIG. 25 is a system block diagram using a wrist-watch-type incoming calling system of a fifth embodiment of the present invention;

FIG. 26 is a block diagram of the PHS slave unit in FIG. 25; and

Figure 27:
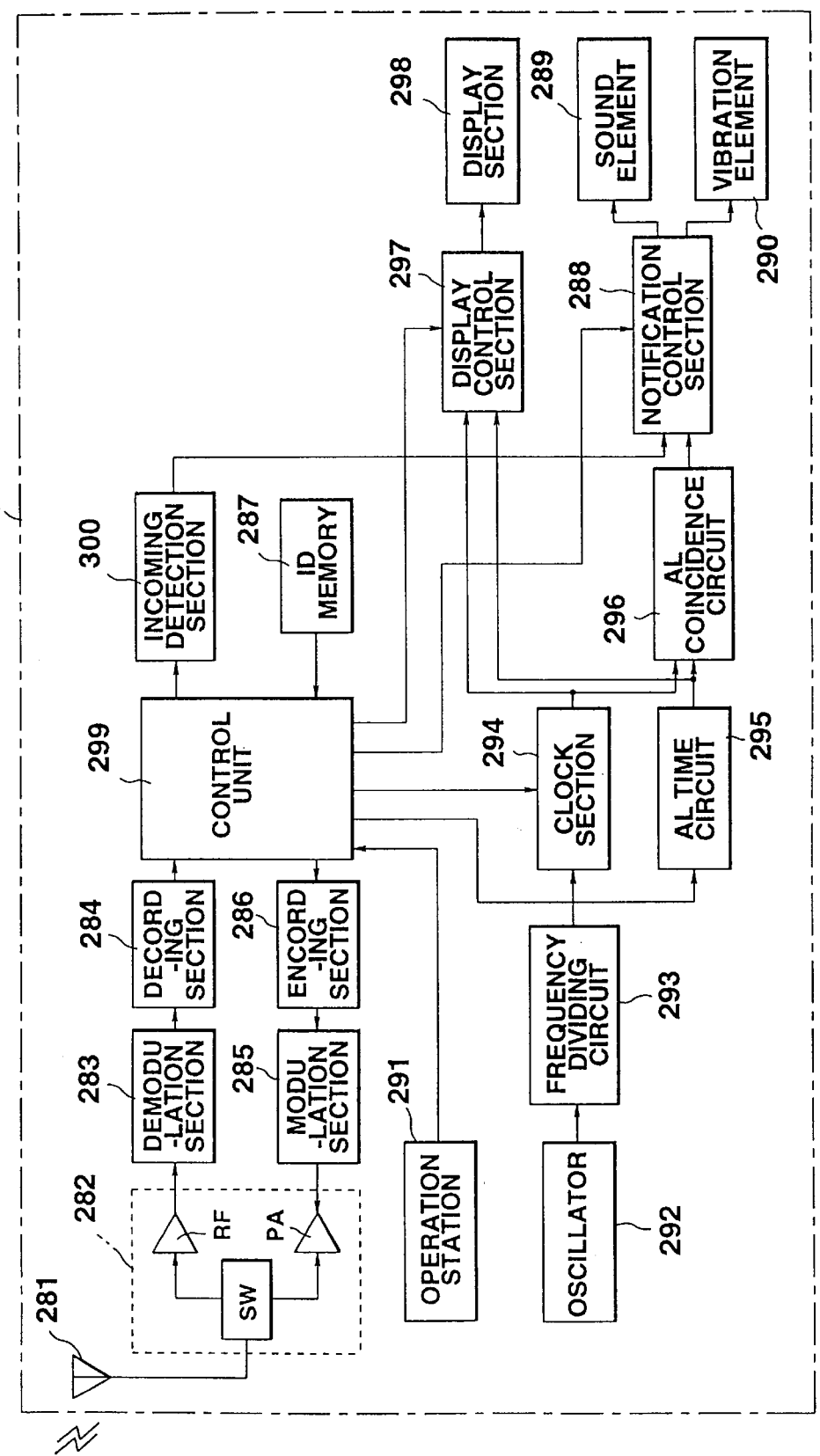

FIG. 27 is a block diagram showing a structure of a wrist-type incoming notification unit provided with a data carrier interface same as that of a PHS slave unit.

BEST MODE FOR CARRYING OUT THE INVENTION

Preferred embodiments of the present invention are described below by referring to the accompanying drawings.

FIGS. 1 to 27 are illustrations for explaining incoming calling systems of the present invention. Therefore, various communication media include a telephone set using a cable telephone circuit, a portable telephone using radio, a car telephone, and cordless-telephone slave unit. In the case of the embodiments described below, incoming calling systems constituted with a case separate from a portable telephone for notifying the user of the incoming to the portable telephone used for a Personal Handy Phone System.

Figure 1:
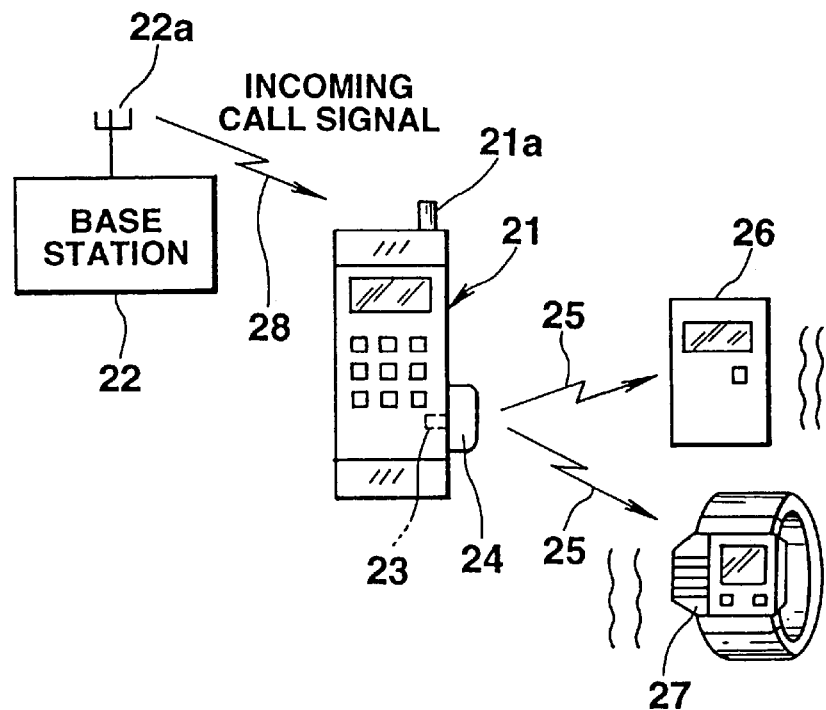
FIG. 1 is a block diagram of an incoming calling system of a first embodiment.

FIG. 1 is a system block diagram of the incoming calling system of the first embodiment. As shown in FIG. 1, for portable telephone 21, radio waves according to communication protocol are transferred to and from base station 22 having antenna 22a and speech is performed with an other-party's general telephone set or portable telephone connected with a public communication network (not shown) through base station 22.

Incoming notification signal transmitter 24 for notifying the user of calling from base station 22 or incoming is removably set to portable telephone 21. Electrical connection is realized by inserting a jack of incoming notification signal transmitter 24 to be mentioned later into earphone-microphone terminal 23 provided for portable telephone 21 side and thereby, an incoming ringing tone can be detected and incoming notification signal transmitter 24 is mechanically supported by portable telephone 21.

Moreover, when incoming for calling portable telephone 21 is received by portable telephone 21, incoming notification signal 25 is output from incoming notification signal transmitter 24 secured to portable telephone 21 by the jack and received by card-type incoming notification signal receiver 26 of a user of portable telephone 21 or wrist-type incoming notification signal receiver 27 set to the wrist of the user, sound or vibration is produced by a sound output buzzer or weight rotational motor included in receiver 26 or 27, and it notified to the user that calling reaches portable telephone 21.

Figure 2:
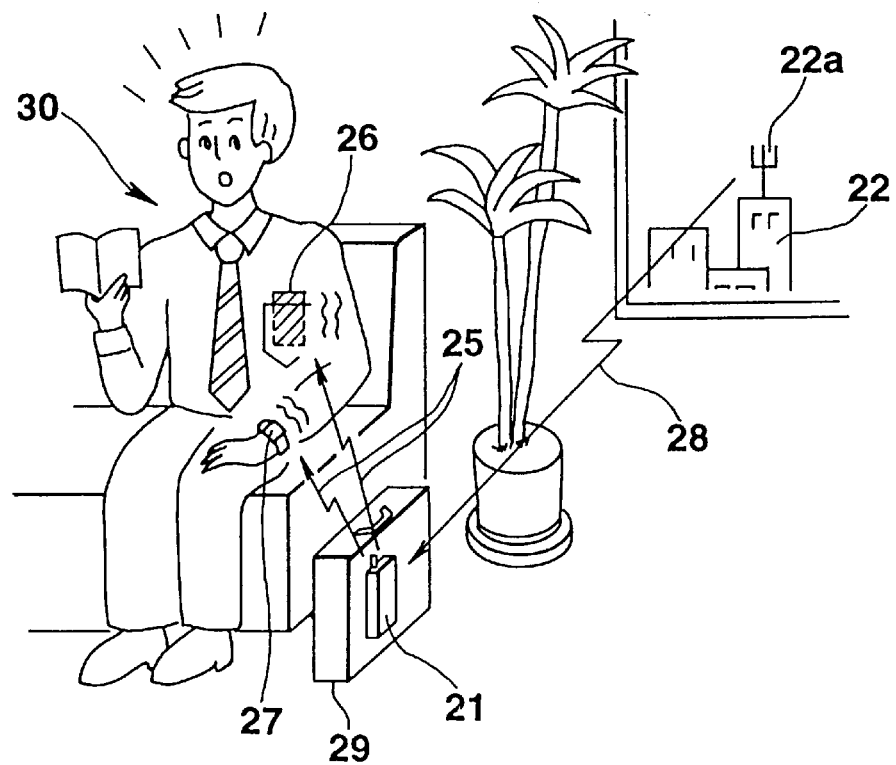
FIG. 2 is an illustration showing a scene in which the user uses the incoming calling system in FIG. 1.

FIG. 2 is an illustration showing a scene in which the user uses the incoming calling system in FIG. 1.

As shown in FIG. 2, because portable telephone 21 is too large to always put it in his pocket, the portable telephone 21 is usually stored in suitcase 29. In this case, as shown in FIG. 1, the jack of incoming notification signal transmitter 24 is inserted into earphone-microphone terminal 23 of portable telephone 21. Thereby, an incoming ringing tone of portable telephone 21 is muffled and therefore, others are prevented from being disturbed and incoming is securely notified to user 30.

That is, when the user is called by the other party, an incoming call signal 28 is transmitted to portable telephone 21 from antenna 22a of base station 22. When portable telephone 21 receives incoming signal 28, an incoming tone (ringing tone) signal is output to incoming notification signal transmitter 24 from earphone-microphone terminal 23. When detecting the input incoming tone (ringing tone), incoming notification signal transmitter 24 transmits incoming notification signal 25 by radio waves.

User 30 of portable telephone 21 has card-type incoming notification signal receiver 26 in his breast pocket or sets wrist-type incoming notification signal receiver 27 on his wrist. When incoming notification signal 25 output from incoming notification signal transmitter 24 is received by receiver 26 or 27, vibration is produced by a weight rotational motor built in each receiver to notify portable telephone 21 that incoming is received. Therefore, it is possible to securely prevent that the user does not sense the incoming.

Then, the circuit structure of each section of the first embodiment shown in FIGS. 1 and 2 is described below in detail by referring to FIGS. 3 to 11.

Figure 3:
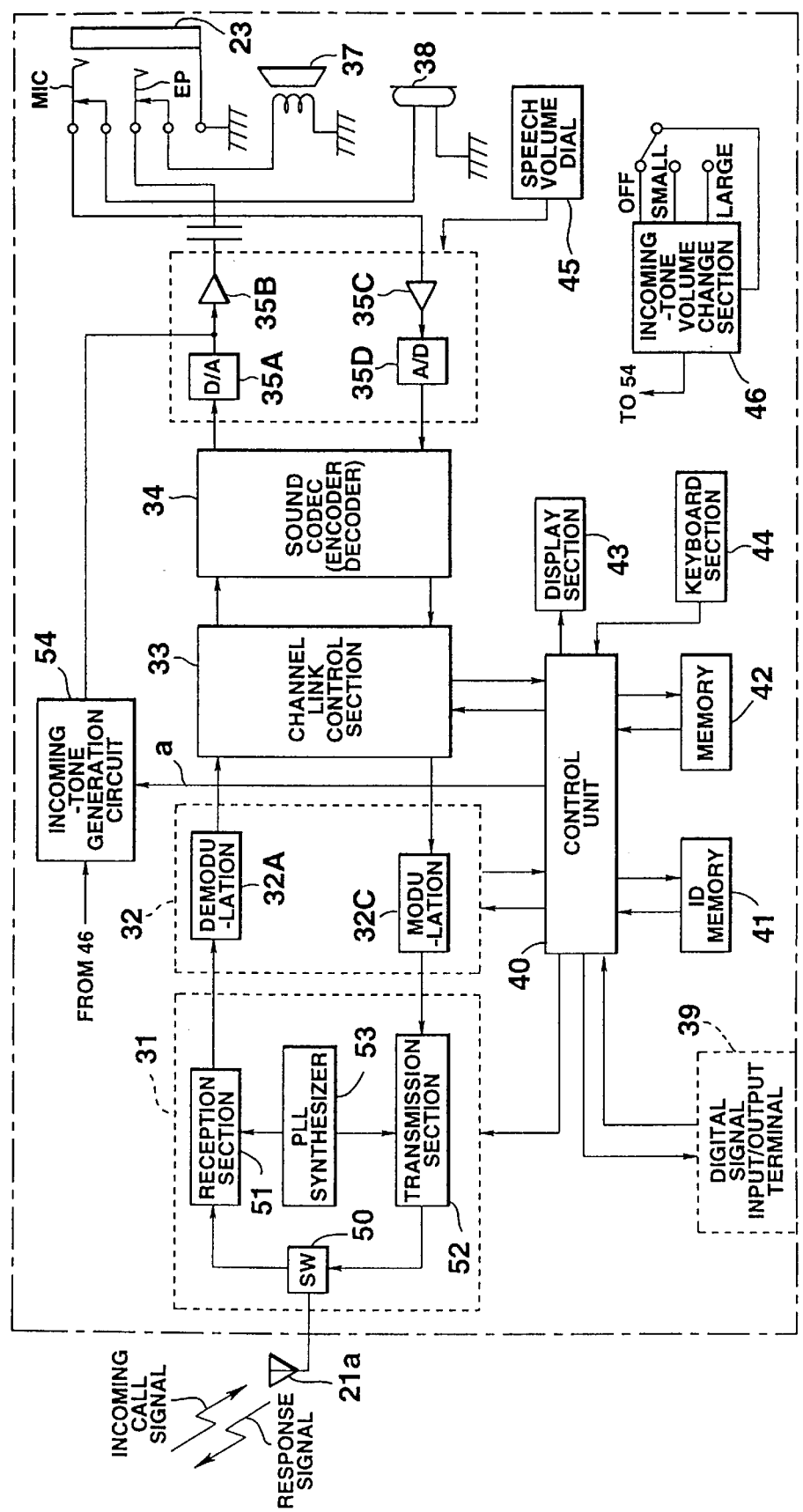
FIG. 3 is a block diagram of the portable telephone in FIG. 1.

FIG. 3 is a block diagram of portable telephone 21 in FIG. 1, which is a portable telephone system used for the cordless telephone system, that is, a portable telephone system for performing multiple connection of channels for a digital modulated signal by the TDMA (Time Division Multiple Access)—TDD (Time Division Duplex) system. Because portable telephone 21 is provided with earphone-microphone terminal 23, it is possible to set an earphone-microphone for hearing ringing tone and voices from the other party or sending voices of his own to the other party.

In FIG. 3, portable telephone 21 comprises antenna 21a, high frequency section 31, modem 32, channel link control section 33, sound CODEC 34, audio interface 35, earphone-microphone terminal 23, speaker 37, microphone 38, digital signal input/output terminal 39, control circuit 40, ID (identification data) memory 41, data memory 42, display section 43, keyboarding section 44, speech volume dial selection section 45, and incoming tone volume change section 46. High frequency section 31 comprises SW (changeover switch) 50, reception section 51, transmission section 52, and PLL synthesizer 53.

Antenna 21a transfers a control signal at a predetermined frequency to and from base station 22 shown in FIG. 1. A public communication network to be connected to base station 22 can use PSTN (Public Switched Telephone Network) or ISDN (Integrated Service Digital Network).

SW 50 of high frequency section 31 performs switching by means of time sharing, connects antenna 21a to reception section 51 and transmission section 52 in an alternative way, outputs a reception signal from antenna 21a to reception section 51, and transmits a transmission signal input from transmission section 52 through antenna 21a.

PLL synthesizer 53 locally oscillates in accordance with a frequency set by control circuit 40 and outputs a local oscillation signal for frequency conversion in reception section 51 and transmission section 52 to reception section 51 and transmission section 52.

Reception section 51 of high frequency section 31 has, for example, a two-stage mixer, frequency-converts a reception signal received by antenna 21a and split by SW 50 to an IF signal by mixing the reception signal with a local oscillation signal input from PLL synthesizer 53, and outputs the IF signal to modem 32.

Transmission section 52 of high frequency section 31 frequency-converts a modulated wave of $\pi/4$-shift QPSK input from modem 32 by a mixer and transmits the frequency-modulated wave from antenna 21a through SW 50.

Modem 32 comprises, for example, demodulation section 32A and modulation section 32B. Demodulation section 32A and modulation section 32B respectively comprise an S/P (Serial-to-Parallel) conversion circuit, a P/S conversion circuit, a differential encoder, a signal mapping circuit, a Nyquist filter, and an orthogonal modulator (which are not shown), and performs modulation/demodulation of $\pi/4$-shift QPSK. That is, modem 32 demodulates an IF signal input from reception section 51 by its demodulation section 32A, separates it to IQ data, and outputs it to channel link control section 33 as a data string. Moreover, modem 32 generates IQ data from a data string input from channel link control section 33 by its modulation section 32A, provides $\pi/4$QPSK modulation for the IQ data, and outputs the IQ data to transmission section 52 of high frequency section 31.

Channel link control section 33 transmits a control signal by a control channel secured by time sharing and performs frame synchronization and slot formatting.

That is, the reception side of channel link control section 33 fetches a slot from data (frame) sent from modem 32 at a predetermined timing, releases the wiretapping prevention scramble and the like, and thereafter fetches constitution data from the format of the slot.

Moreover, the reception side of channel link control section 33 sends control data out of the fetched constitution data to control circuit 40 and transfers ADPCM (Adaptive Differential PCM) sound data to sound CODEC 34.

Furthermore, the transmission side of channel link control section 33 adds control data to sound data transferred from sound CODEC 34 to generate a slot and applies scramble to the slot, and thereafter inserts the slot into a frame and outputs it to modem 32.

Sound CODEC 34 performs compression or extension of digital sound data. Specifically, sound CODEC 34 encodes or decodes digital sound data by ADPCM using adaptive prediction and adaptive quantization.

That is, the reception side of sound CODEC 34 extends ADPCM sound data sent from channel link control section 33 by decoding the data to a PCM aural signal and outputs it to audio interface 35.

Moreover, the transmission section of sound CODEC 34 compresses a PCM speech signal input from audio interface 35 by encoding the signal to ADPCM speech data and outputs it to channel link control section 33.

Audio interface 35 performs analog-digital conversion of a speech signal and controls a speech volume or incoming tone volume.

That is, the reception side of audio interface 35 converts a PCM speech signal sent from speech CODEC 34 to an analog speech signal by digital-analog conversion circuit 35A, amplifies the signal by amplifier 35B, and loudly outputs it from speaker 37. Moreover, the transmission section of audio interface 35 digital-amplifies an analog aural signal input from microphone 38 by amplifier 35C and thereafter, converts the signal to a digital speech signal by analog-digital conversion circuit 35D and outputs it to sound CODEC 34 as a PCM speech signal.

Furthermore, audio interface 35 amplifies an incoming tone signal sent from incoming tone generation circuit 54 and generated under the control by control circuit 40 to be mentioned later, outputs an incoming tone (ringing tone) by driving speaker 37, and notifies the user that incoming call is received.

In the case of earphone-microphone terminal 23, a contact for connecting audio interface 35, speaker 37, and microphone 38 is arranged in a terminal. When a jack of an external unit to be mentioned later is inserted from the outside, the contact for connecting audio interface 35, speaker 37, and microphone 38 separates, audio interface 35 is electrically connected to the external unit, and for example, a speech signal is output to the external unit.

Digital signal input/output terminal 39 is a connection terminal used to transfer digital data such as characters by portable telephone 21. Therefore, by connecting a cable of a personal computer or other unit having a data transfer function to digital signal input/output terminal 39 and performing communication with a transfer destination, it is possible to easily transfer data.

Control circuit 40 comprises a CPU (Central Processing Unit) and a ROM (Read Only Memory) (not shown), which performs processing in accordance with a series of communication protocols such as storing the above digital data in RAM 42 (Random Access Memory) serving as a data memory, performing communication in portable telephone 21 or communication control according to a communication control program, displaying a telephone number input from keyboard section 44 on display section 43, entering a re-dialing number in a RAM, performing re-dialing calling in accordance with the re-dialing number, collating an ID code included in a reception signal with an ID code stored in ID memory 41 and deciding the incoming to the terminal of its own when these ID codes coincide each other and outputting an instruction signal "a" for making incoming tone generation circuit 54 output an incoming tone signal, and transmitting an incoming call response signal to establish a link by channel link control section 33.

Display section 43 comprises, for example, a liquid crystal display and displays various pieces of information to be notified to the user of portable telephone 21 from portable telephone 21 such as a telephone number of a speech destination input from keyboard section 44 and speech time.

Keyboard section 44 comprises various keys such as numerical keys, an asterisk key, a holding key, and a speech key and allows the user to input necessary information by these keys. Control circuit 40 controls various sections of portable telephone 21 so that a processing corresponding to a pressed key of keyboard section 44 when keyboard section 44 is operated.

Speech volume dial selection section 45 is a volume switch for adjusting speech volume when audio interface 35 performs analog-digital conversion of a speech signal.

Incoming-tone volume change section 46 is a changeover switch for adjusting the volume of an incoming tone (ringing tone), in which the output of the incoming tone can be selected in three levels of "off", "low", and "high" and its output signal is sent to incoming tone generation circuit 54.

When an incoming signal is transmitted from the other party through base station 22 by radio waves, portable telephone 21 sends the incoming signal to channel link control section 33 through antenna 21a, SW 50, reception section 51, and modem 32. Channel link control section 33 fetches a control signal and sends it to control circuit 40.

Control circuit 40 collates the ID code included in the control signal by ID memory 41. When the signal is the incoming call to the terminal of its own, the circuit 40 sends an incoming call response signal to modem 32 and transmission section 52 together with a control signal generated by channel link control section 33 in order to respond to the incoming call and transmits them through SW 50 and antenna 21a. Moreover, at the same time, control circuit 40 outputs an incoming tone signal to audio interface 35 from incoming tone generation circuit 54 in order to ring an incoming tone, drives speaker 37 to output an incoming tone (ringing tone), and notifies the user that incoming call is received.

When an incoming call response signal is transmitted to a telephone terminal of the other party and a control circuit of the telephone terminal of the other party confirms that the line is connected because a response is sent from portable telephone 21, speech processing is started.

However, when a speech key is pressed from keyboard section 44 of portable telephone 21 and a telephone number of the speech destination is input, the input telephone number is sent to modem 32 and transmission section 52 together with a control signal generated by channel link control section 33 and transmitted through SW 50 and antenna 21a.

When the other party responds and a response signal is sent from the other party, the response signal is sent to channel link control section 33 through antenna 21a, SW 50, reception section 51, and modem 32. Channel link control section 3 fetches a control signal and sends it to control circuit 40.

When control circuit 40 confirms by means of the control signal that the other party responds and the line is connected, it starts speech processing.

In the case of the above speech processing, SW 50 of high frequency section 31 switches reception section 51 and transmission section 52 by time sharing and sends a reception signal to modem 32 and channel link control section 33. Channel link control 33 separately outputs speech data to sound CODEC 34 and a control signal to control circuit 40.

The speech data output to sound CODEC 34 is decoded by ADPCM and output to audio interface 35, converted to a speech signal by audio interface 35, and output from speaker 37.

The speech signal input from microphone 38 is converted to a digital speech signal by audio interface 35, encoded to an ADCM speech signal and compressed by sound CODEC 34, and output to channel link control section 33.

The speech signal sent to channel link control section 33 is provided with a control signal output from control circuit 40 by channel link control section 33 and thereafter transmitted through modem 32, transmission section 52, SW 50, and antenna 21a.

Figure 4:
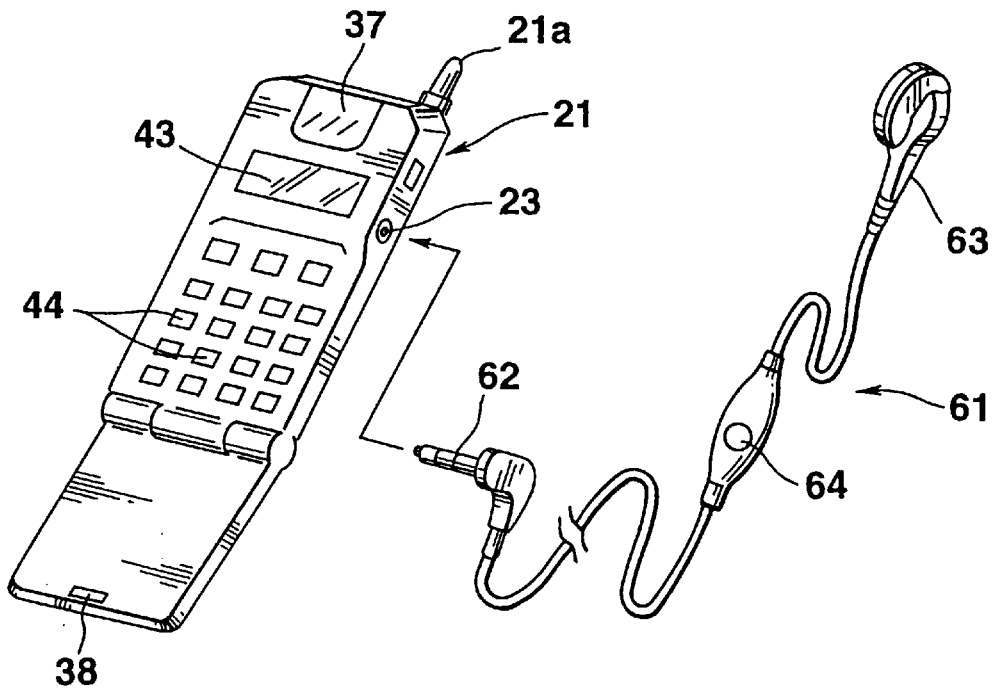
FIG. 4 is an illustration showing a case of using an earphone-microphone terminal provided for the portable telephone in FIG. 3.
Figure 5:
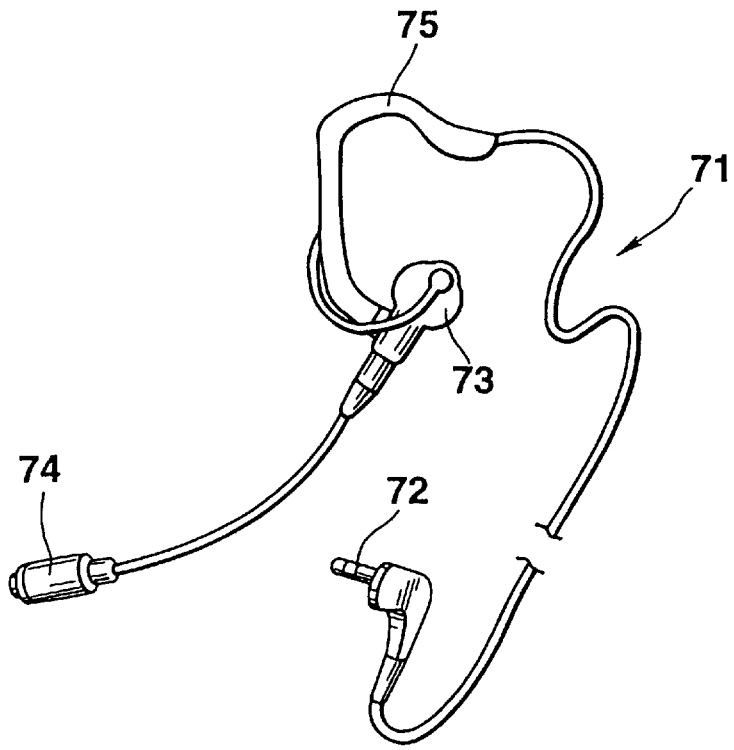
FIG. 5 is a perspective view of an earphone-microphone provided with a head arm.

FIG. 4 is an illustration showing a case of using earphone-microphone terminal 23 provided for portable telephone 21 in FIG. 3. FIG. 5 is a perspective view of earphone-microphone 71 provided with a head arm.

In FIG. 4, when jack 62 of earphone-microphone 61 is connected to earphone-microphone terminal 23, a handset (speaker 37 and microphone 38) built in portable telephone 21 is turned off and voices are output to earphone 63, and moreover it is possible to input voices from external microphone 64. Thereby, it is possible to perform speech without having portable telephone 21 (hand-free) and enjoy clear speech even under a noisy state.

Moreover, earphone-microphone 71 shown in FIG. 5 can be used as described above by connecting it to earphone-microphone terminal 23 of portable telephone 21. Because earphone 73 and microphone 74 are secured by head arm 75 so that earphone 73 is located at a user's ear and microphone 74 is located at his mouth, speech can naturally be performed.

Figure 6:
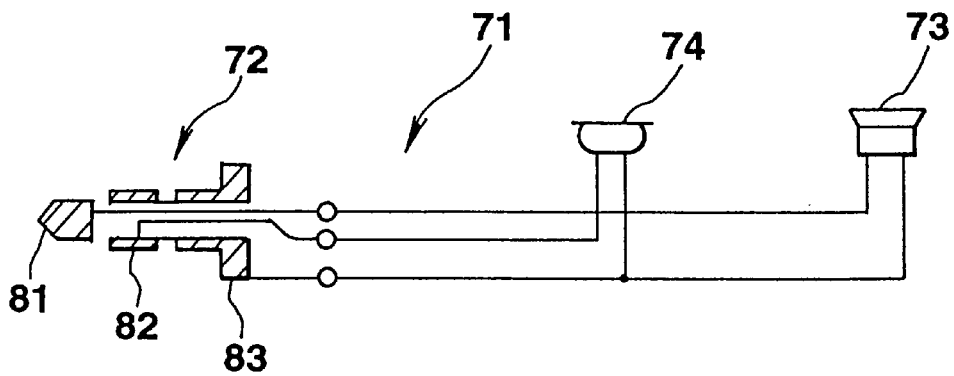
FIG. 6 is an illustration showing a structure of the earphone-microphone in FIG. 5.

FIG. 6 is an illustration showing a structure of earphone-microphone 71 in FIG. 5, in which jack 72 is divided into earphone terminal 81, microphone terminal 82, and ground terminal 83.

Figure 7A:
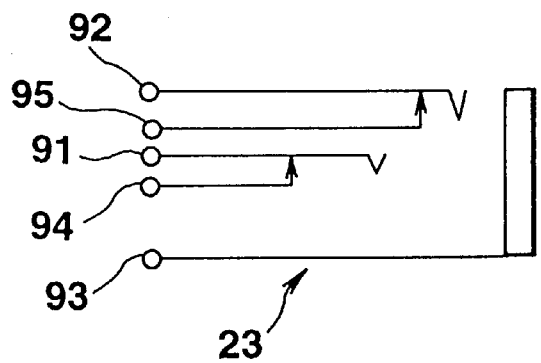
FIGS. 7A and 7B are illustrations showing states before and after a jack is inserted into an earphone-microphone terminal.

FIG. 7A is an illustration showing states before and after jack 72 is inserted into earphone-microphone terminal 23. Earphone-microphone terminal 23 comprises earphone contact 91 extended from audio interface 35, microphone 92, ground contact 93, built-in speaker contact 94, and built-in microphone 95.

Figure 7B:
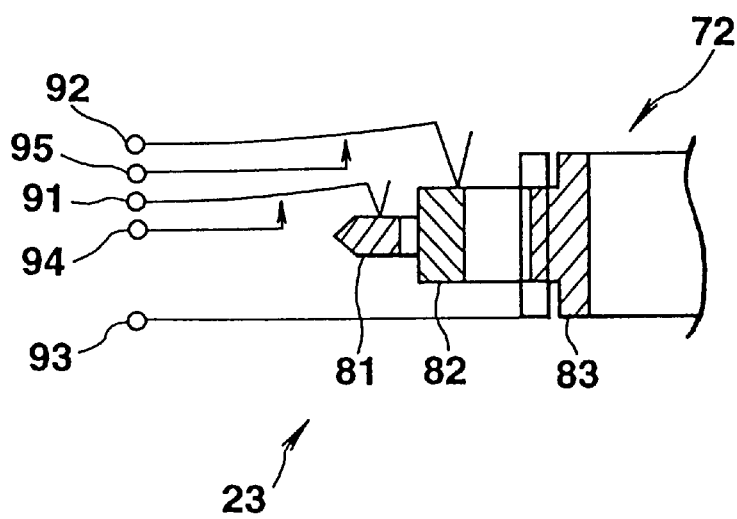

FIG. 7B shows a state in which jack 72 is inserted into earphone-microphone terminal 23.

As shown in FIG. 7B, when jack 72 is inserted into earphone-microphone terminal 23, earphone terminal 81 raises earphone contact 91, microphone terminal 82 is raised to microphone contact 92, and ground terminal 83 contacts ground contact 93. Thereby, built-in speaker contact 94 and built-in microphone contact 95 are disconnected and switched to external earphone-microphone 71.

Speech volume, incoming tone volume, and incoming tone on/off are set by speech volume dial selection section 45 and incoming tone volume change section 46 shown in FIG. 3.

The incoming calling system of the first embodiment is provided with incoming notification signal transmitter 24 for connecting a jack to earphone-microphone terminal 23 of the above-described portable telephone 21. Incoming notification signal transmitter 24 is formed into a size of, for example, a length of 3 to 5 cm, width of 2 to 3 cm, and thickness of approx. 1 cm.

Figure 8:
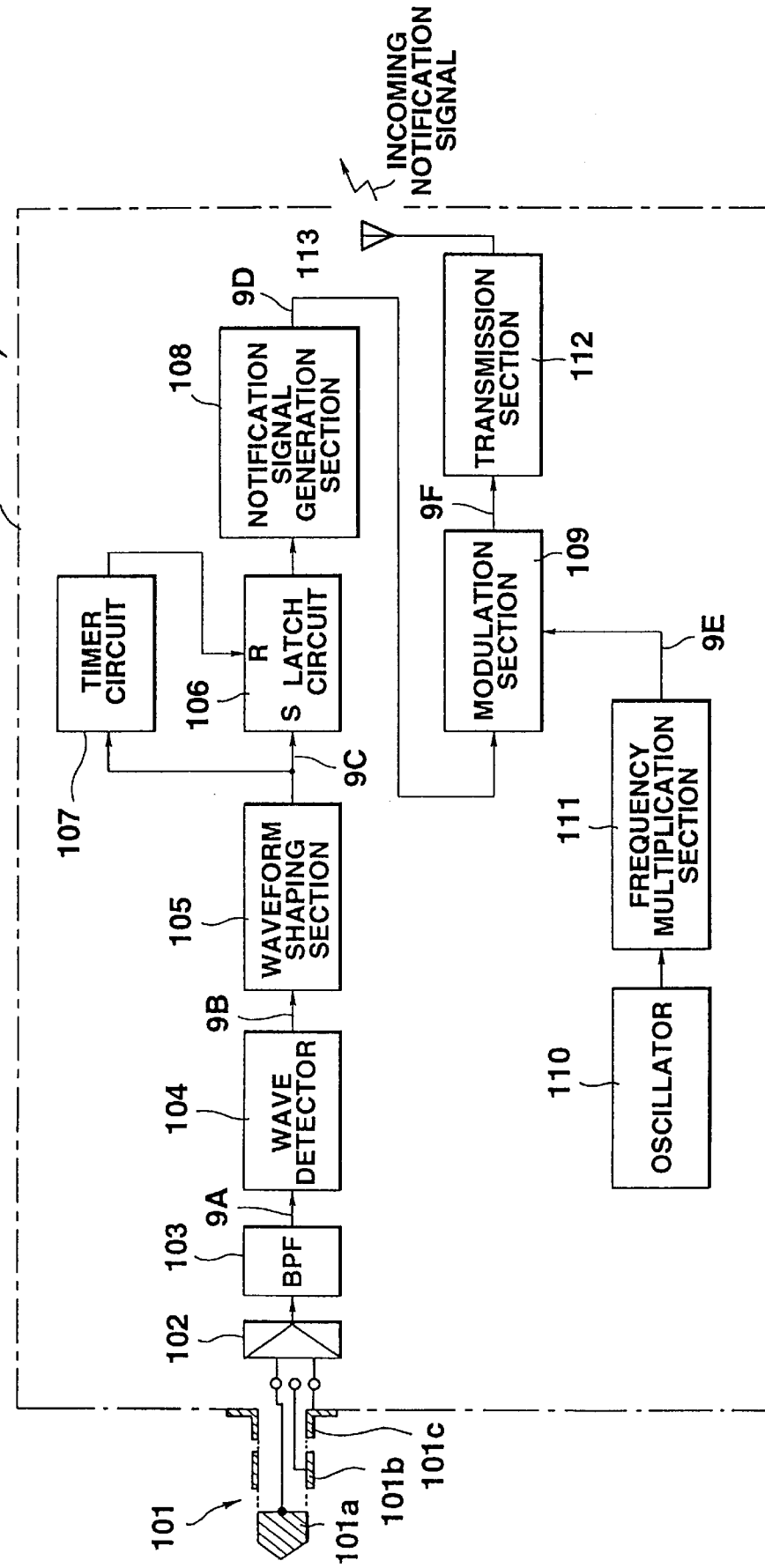
FIG. 8 is a circuit block diagram of an incoming notification signal transmitter of the first embodiment.

FIG. 8 is a circuit block diagram in case 24a of incoming notification signal transmitter 24.

Incoming notification signal transmitter 24 shown in FIG. 8 comprises jack 101, amplifier 102, band-pass filter (BPF) 103, wave detector 104, waveform shaping section 105, latch circuit 106, timer circuit 107, notification signal generation section 108, modulation section 109, oscillator 110, frequency multiplication section 111, transmission section 112, and antenna 113.

Jack 101 corresponds to jack 72 in FIG. 7B to be inserted into earphone-microphone terminal 23, which fetches the speech signal of an incoming tone from portable telephone 21. Therefore, earphone terminal 101a and ground terminal 101c are connected to an internal circuit but microphone terminal 101b is not connected.

When incoming calling is received by portable telephone 21, an incoming tone is normally output from built-in speaker 37. However, when jack 101 of incoming notification signal transmitter 24 is connected to earphone-microphone terminal 23, no incoming tone is output from speaker 37 but the speech signal of an incoming tone is input to incoming notification signal transmitter 24 through jack 101.

As shown in FIG. 8, the speech signal of an input incoming tone is amplified by amplifier 102 and only a speech signal in a frequency band peculiar to an incoming tone is selectively fetched by band-pass filter 103.

Figure 9A:
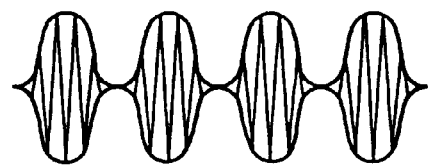

FIGS. 9A to 9F are waveform diagrams showing output signal waveforms 9A to 9F of various sections in FIG. 8, in which FIG. 9A shows sound waveforms of incoming tones "ru, ru, ru, . . . " (phonetic) selectively fetched by band-pass filter 103.

Figure 9B:
Figure 9C:

Then, signal waves are detected by wave detector 104 to obtain the signal waveforms shown in FIG. 9B and the signal waveforms are waveform-shaped by waveform shaping section 105 and the rectangular waveforms shown in FIG. 9C are fetched. Then, latch circuit 106 is set by the rectangular waveforms and timer circuit 107 is operated so that incoming notification signals are transmitted by radio only for a predetermined certain time.

Figure 9D:
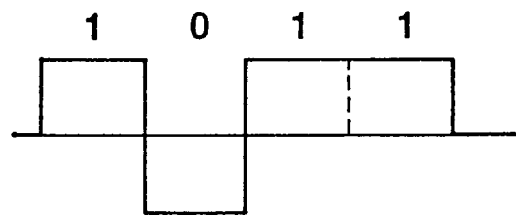

That is, signals set to latch circuit 106 are used to generate an incoming notification signal comprising a predetermined pattern such as "1, 0, 1, 1" shown in FIG. 9D by notification signal generation section 108 until a reset signal is input from timer circuit 107.

Moreover, oscillation waveforms with a predetermined frequency are input to frequency multiplication section 111 from oscillator 110 to generate carrier waves (fc) shown in FIG. 9E.

Furthermore, modulation section 109 performs modulation for wireless-transmitting an incoming notification signal sent from notification signal generation section 108 by carrier waves. A modulated signal comprises "dense" waveforms (fm) with a high frequency and "thin" waveforms (fs) with a low frequency, which is transmitted from antenna 113 by superposing the incoming notification signal on radio waves by transmission section 112. The modulated waveforms fm are obtained by adding Δf to the carrier waves fc (fm=fc+Δf) and the modulated waveforms fs are obtained by subtracting Δf from the carrier waves fc (fm=fc−Δf).

For the incoming calling system of the first embodiment, incoming notification signal receiver 26 or 27 for receiving an incoming notification signal sent from incoming notification signal transmitter 24 is formed in a separate case. Incoming notification signal receiver 26 is a card-type incoming notification signal receiver formed like a thin card and incoming notification signal receiver 27 is a wrist-type incoming notification signal receiver to be used together with a wrist watch set to an arm.

Figure 10:
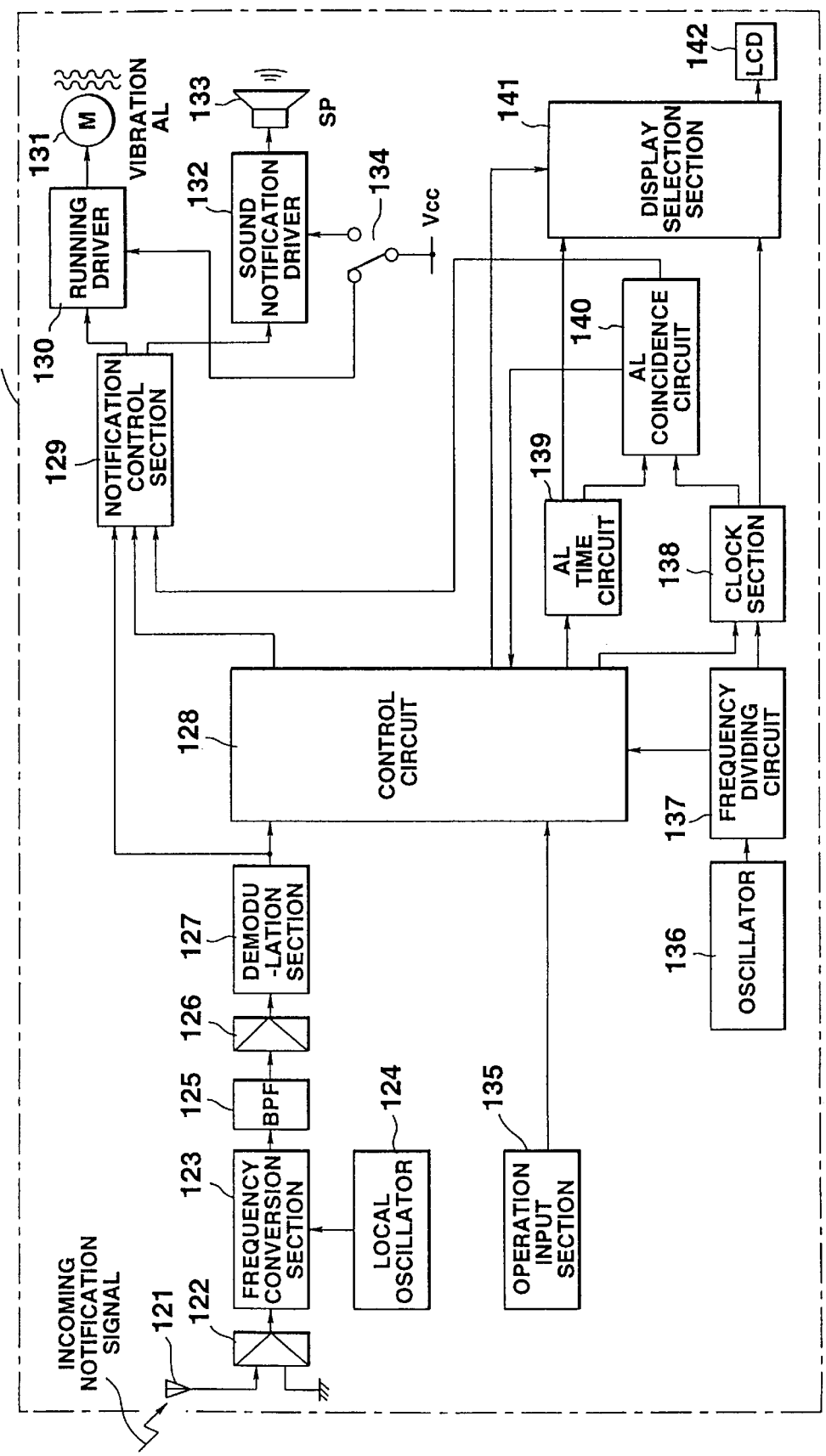
FIG. 10 is a circuit block diagram of a wrist-type incoming notification signal receiver of the first embodiment.

FIG. 10 is a circuit block diagram of wrist-type incoming notification signal receiver 27.

Incoming notification signal receiver 27 shown in FIG. 10 comprises antenna 121, amplifier 122, frequency conversion section 123, local oscillator 124, band-pass filter (BPF) 125, amplifier 126, demodulator 127, control circuit 128, notification control section 129, running driver 130, motor 131, sound notification driver 132, speaker 133, power supply changeover switch 134, operation input section 135, oscillator 136, frequency dividing circuit 137, clock section 138, alarm time circuit 139, alarm coincidence circuit 140, display selection section 141, and liquid crystal display (LCD) 142.

Radio waves of the incoming notification signal sent from incoming notification signal transmitter 24 are received by antenna 121 and amplified by amplifier 122.

Figure 9F:
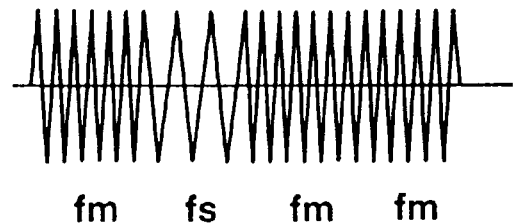
Figure 11A:
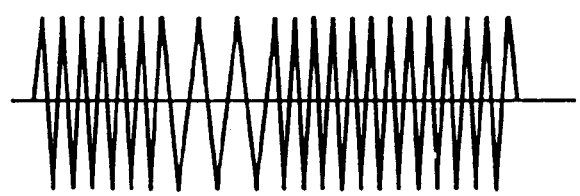
FIGS. 11A to 11C are waveform diagrams showing output signal waveforms of various sections in FIG. 10.
Figure 11B:
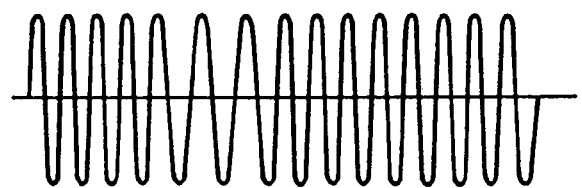
Figure 11C:
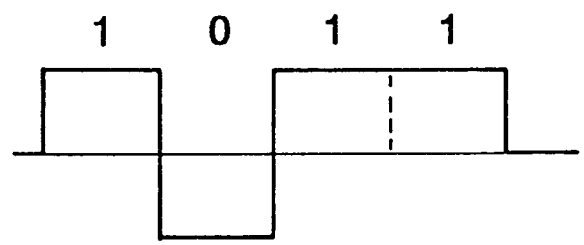

FIGS. 11A to 11C are waveform diagrams showing output signal waveforms of various sections in FIG. 10, in which the waveforms in FIG. 11A are signal waveforms amplified by amplifier 122 and therefrom, compression waves are fetched almost same as those in FIG. 9F at the transmitter side and output to frequency conversion section 123.

In the case of frequency conversion section 123 in FIG. 10, the frequency of the signal in FIG. 11A is converted by local oscillator 124 to generate the waveforms shown in FIG. 11B, noises are removed from the waveforms by passing them through band-pass filter 125 to fetch only necessary signal components, and the components are amplified by amplifier 126 and demodulated by demodulation section 127. Thereby, as shown in FIG. 11C, a digital incoming notification signal comprising "1, 0, 1, 1" same as that in FIG. 9D at the transmitter side is correctly restored.

When control circuit 128 determines that a signal comprising the above predetermined "1, 0, 1, 1" is input as an incoming notification signal, the circuit 128 performs notification by assuming that incoming is received by portable telephone 21 provided with incoming notification signal transmitter 24 and thereby, rotating motor 131 eccentrically provided with a weight by running driver 130 to generate a vibration alarm or driving speaker 133 by sound notification driver 132 to generate buzzer sound.

Power supply changeover switch 134 is a changeover switch for supplying driving power to running driver 130 and sound notification driver 132. When notification control section 129 makes either driver selectively perform notification, it switches power supply changeover switch 134 so as to supply power to desired driver 130 or 132 from a power supply VCC.

Operation input section 135 shown in FIG. 10 not only performs input operations about the above incoming notification but also performs input operations for setting an alarm and time about the clock function to be mentioned later.

Moreover, clocks at a predetermined frequency are output to frequency dividing circuit 137 from oscillator 136 and the present time is measured by clock section 138 in accordance with divided clocks.

Furthermore, to use an alarm function, an alarm time is previously set to alarm time circuit 139 and it is monitored by alarm coincidence circuit 140 whether the present time data sent from clock section 138 coincides with the alarm time data set to alarm time circuit 139. When the former coincides with the latter, the circuit 140 directs notification control section 129 to perform notification by vibration or buzzer sound.

Furthermore, display selection section 141 displays an alarm set time and the present time or whether the incoming notification signal is received on liquid crystal display (LCD) 142 by properly selecting data to be displayed.

The circuit structure of card-type (or electronic-calculator-type incoming notification signal receiver) 26 is not described above though wrist-type incoming notification signal receiver 27 is described. However, an incoming notification signal processing circuit is completely the same as that of receiver 27. However, the structure of receiver 26 is different from that of receiver 27 in that the card type is further provided with a circuit for processing electronic calculator functions such as the four rules of arithmetic in stead of a circuit for processing clock functions in the above wrist type.

As described above, the incoming calling system of the first embodiment is constituted so that the jack of incoming notification signal transmitter 24 for radio-transmitting an incoming notification signal is inserted into a speech signal output terminal such as earphone-microphone terminal 23 provided for portable telephone 21 and portable incoming notification signal receivers 26 and 27 constituted with cases different from the case of transmitter 24 are set to a part of the body of the user of portable telephone 21.

When portable telephone 21 receives an incoming call signal (or incoming calling signal) and rings an incoming tone, incoming notification signal transmitter 24 wave-detects the speech signal of the incoming tone through a jack from earphone-microphone terminal 23 and detects that the incoming tone is generated and then, generates an incoming notification signal to radio-transmit the signal to incoming notification signal transmitters 26 and 27.

When incoming notification signal receivers 26 and 27 respectively receive an incoming notification signal, they notify the user by buzzer sound or vibration. Therefore, the user can securely recognize incoming even when surroundings are noisy or he easily fails to hear an incoming tone because he has portable telephone 21 in his suitcase or bag.

Then, when the user recognizes incoming by the above notification, he removes the jack of incoming notification signal transmitter 24 from earphone-microphone terminal 23 of portable telephone 21 and communicates with the other party by using speaker 37 and microphone 38. Because the first embodiment uses a structure of detecting an incoming tone of a portable radio to perform notification, it is possible to accurately notify the user of only incoming without confusing radio waves emitted except in the case of incoming such as radio waves for outgoing, speech, or position entry when the user moves exceeding the radio area with radio waves for incoming.

Moreover, incoming notification signal transmitter and receiver respectively use an exclusive transmitter-receiver and a code to be transmitted is previously determined ("1011" for the above example), and the receiver determines that incoming is received when receiving the above predetermined code. Therefore, by using a code different for each transmitter-receiver, it is possible to securely recognize only incoming to the portable telephone of his own without responding to the incoming to an other-person's portable telephone because codes are different even if there is the other-person's portable telephone nearby and the transmitter-receiver of this embodiment is used.

Furthermore, because buzzer sound and vibration alarm can be changed as notification means in accordance with the surrounding state, it is possible to properly select either of them so that incoming can securely be recognized without disturbing others.

The first embodiment is constituted so as to input a speech signal of an incoming tone by connecting a jack to an earphone-microphone terminal provided for a portable telephone. However, it is also possible to constitute the first embodiment by using a sound output terminal or incoming tone output terminal other then the above as an earphone-dedicated output terminal or an incoming output terminal other than a speech signal terminal.

Particularly, in the case of a portable telephone provided with an incoming tone generation buzzer of speaker and a speaker for speech, it is possible to prevent an incoming tone from being generated by the incoming tone generation buzzer or speaker by using an earphone terminal section, setting incoming notification signal transmitter 24 to the earphone terminal section, and transmitting an incoming notification signal to receiver 26 or 27 from transmitter 24 so as to notify the user of incoming call.

Moreover, it is possible to constitute the first embodiment so as to input the speech signal of an incoming tone by connecting the jack with the speaker of the handset section of a portable telephone, a pickup for inputting the sound of a ringing-tone generation buzzer, or a sound output signal line instead of connecting with the earphone-microphone terminal.

Furthermore, though the first embodiment shown in FIG. 8 is constituted so as to transmit a detected incoming notification signal by radio waves through FM modulation or FSK modulation, it is also possible to constitute the first embodiment by using other modulation method such as AM modulation including ASK modulation or PM modulation including PSK modulation.

Furthermore, though the first embodiment is constituted so as to transmit/receive an incoming notification signal by radio waves, it is also possible to adopt other radio (wireless) communication method using ultrasonic waves, electromagnetic induction, or infrared radiation.

For the second embodiment, the structures of various sections shown in the drawings are constituted like those in FIGS. 12A to 16. The second embodiment is described below in detail by referring to the accompanying drawings. In FIGS. 12A to 16 showing the second embodiment, a symbol same as that in drawings described for the first embodiment is the same or equivalent section and its description is omitted.

Though the first embodiment is constituted so as to transfer an incoming notification signal from incoming notification signal transmitter 24 to card-type incoming notification signal receiver 26 or wrist-type incoming notification signal receiver 27, the second embodiment is constituted so that frequencies of radio waves to be transmitted or received can be changed by using a change system capable of changing frequencies of carrier waves in several levels without changing the type of radio waves.

Thereby, even if an incoming calling system of the same type or a unit having other purpose but using radio waves at the same frequency is used nearby, radio interference or communication disturbance can be prevented by changing frequencies and accurate and reliable incoming notification can be performed.

Figure 12A:
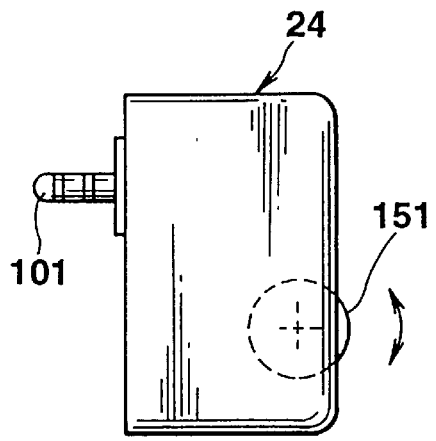
FIGS. 12A and 12B are full views of an incoming notification signal transmitter of a second embodiment.
Figure 12B:
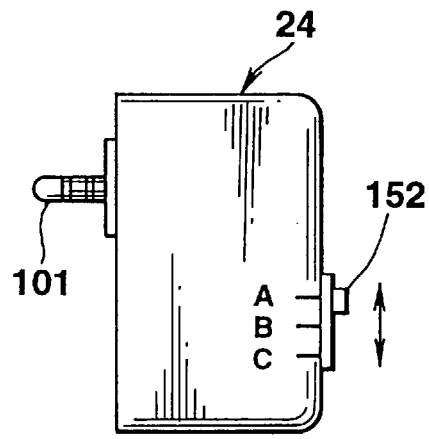

FIGS. 12A and 12B are full views of incoming notification signal transmitter 24 of the second embodiment. In the case of incoming notification signal transmitter 24, jack 101 is protruded similarly to the case of the first embodiment and transmitter 24 is used by inserting jack 101 into earphone-microphone terminal 23 of portable telephone 21 shown in FIG. 1.

Incoming notification signal transmitter 24 shown in FIG. 12A is characterized in that it is provided with dial-type frequency setting section 151. By turning the dial in any arrow direction, it is possible to radio-transmit an incoming notification signal at a desired frequency.

Moreover, incoming notification signal transmitter 24 in FIG. 12B is characterized in that it is provided with change-type frequency setting section 152. By sliding the changeover switch in the arrow direction, it is possible to select any one of three frequency levels A, B, and C and radio-transmit an incoming notification signal at a selected frequency.

Figure 13:
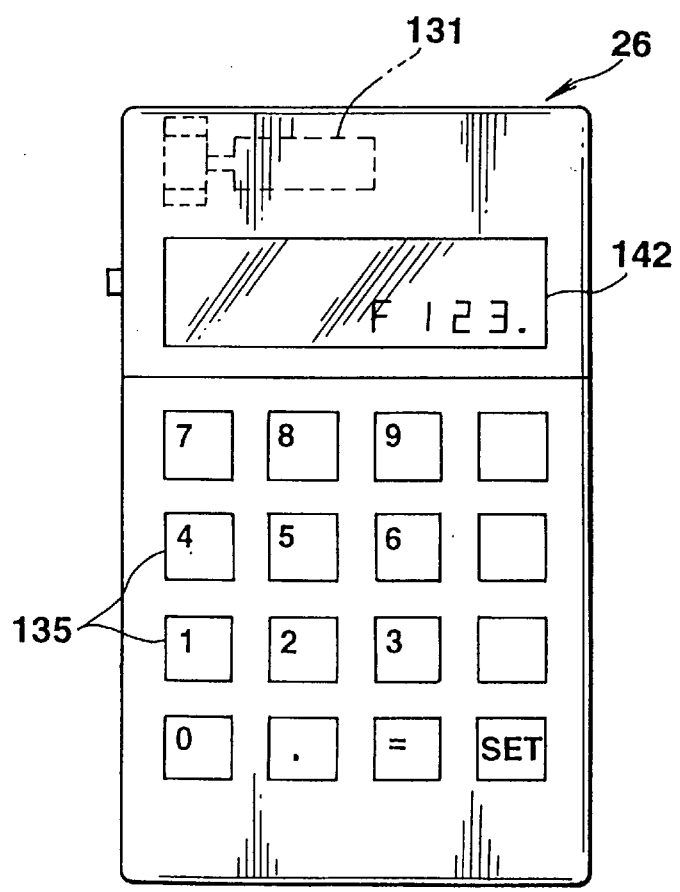
FIG. 13 is a full view of a card-type incoming notification signal receiver of the second embodiment.

FIG. 13 is a full view of card-type incoming notification signal receiver 26 of the second embodiment.

When card-type incoming notification signal receiver 26 shown in FIG. 13 receives an incoming notification signal radio-transmitted from incoming notification signal transmitter 24 in FIG. 12A or 12B, it performs incoming notification by vibration or buzzer sound. Card-type incoming notification signal receiver 26 has a built-in motor 131 with a weight eccentrically added to the rotary shaft. When the receiver 26 receives an incoming notification signal, it drives motor 131 and the whole of it vibrates. Therefore, it is possible to notify a person having the receiver 26 of incoming.

Card-type incoming notification signal receiver 26 in FIG. 13 is characterized in that the converted frequency (detected frequency) of an incoming notification signal at the receiver side can be changed to a frequency same as the frequency set at the transmitter side by using numerical keys of operation input section 135. As shown in FIG. 13, in the case of card-type incoming notification signal receiver 26, a frequency to be set (e.g. F123) is displayed on LCD 142 by setting a reception frequency setting mode and inputting a desired frequency by numerical keys and a reception frequency is changed to the present frequency by pressing the setting key.

FIG. 14 is a full view of wrist-type incoming notification signal receiver 27 of the second embodiment.

When wrist-type incoming notification signal receiver 27 shown in FIG. 14 receives an incoming notification signal radio-transmitted from incoming notification signal transmitter 24, it performs incoming notification by vibration or buzzer sound. Wrist-type incoming notification signal receiver 27 has a built-in motor 131 with a weight eccentrically added to the rotary shaft. Therefore, when receiving an incoming notification signal, receiver 27 drives motor 131 so as to vibrate the whole of the receiver. Therefore, it is possible to notify a person having the receiver 27 on his arm of incoming.

Wrist-type incoming notification signal receiver 27 in FIG. 14 is characterized in that the set converted frequency of an incoming notification signal at the receiver side can be changed correspondingly to the transmitter side by using input keys of operation input section 135. As shown in FIG. 14, wrist-type incoming notification signal receiver 27 displays frequencies which can be set on LCD 142 by setting the reception frequency setting mode. Therefore, a frequency is changed to the present reception frequency (A:F123) by repeatedly pressing the input key to move a cursor to the position of a desired frequency and decide the frequency.

FIG. 15 is a circuit block diagram of incoming notification signal transmitter 24 of the second embodiment.

The structure of incoming notification signal transmitter 24 shown in FIG. 15 is almost the same as that of the first embodiment (see FIG. 8). However, transmitter 24 is characterized in that frequency setting section 151 (152), local oscillator 153, and frequency conversion section 154 are included in addition to the structure of the first embodiment in FIG. 8.

Incoming tone input terminal 101 shown in FIG. 15 is a terminal connected to a portable telephone to input the data for detecting an incoming tone. Though terminal 101 corresponds to jack 101 to be inserted into earphone-microphone terminal 23 of portable telephone 21 in this case, it is not always restricted to jack 101.

Therefore, when portable telephone 21 receives incoming call, an incoming tone is output from built-in speaker 37. However, incoming tone input terminal 101 of incoming notification signal transmitter 24 is connected to earphone-microphone terminal 23, the incoming tone is not output to speaker 37 but the speech signal of the incoming tone is input through incoming tone input terminal 101.

Moreover, the input speech signal of the incoming tone is amplified by amplifier 102 and only speech signals in a predetermined frequency band are fetched by band-pass filter 103, and the fetched speech signals are wave-detected by wave detector 104 and waveform-shaped by waveform shaping section 105.

Furthermore, latch circuit 106 is set by waveform-shaped rectangular waves and timer circuit 107 is operated so as to radio-transmit incoming notification signals only for a certain time. That is, the signals set to latch circuit 106 are output to modulation section 109 at the next stage by generating incoming notification signals from notification signal generation section 108 until a reset signal is input from timer circuit 107.

Furthermore, a predetermined oscillation frequency is input to frequency multiplication section 111 from oscillator 110. The carrier waves generated by section 111 are output to modulation section 109 and modulated by an incoming notification signal sent from notification signal generation section 108 to transmit a radio signal.

The second embodiment converts the frequency of an incoming notification signal modulated by modulation section 109 to a desired frequency by frequency setting section 151 (152), local oscillator 153, and frequency conversion section 154 which are newly added to the next stage.

That is, by previously setting a transmission frequency by means of frequency setting section 151 (152), a predetermined oscillation frequency is output from local oscillator 153 in accordance with the set frequency and the frequency of a modulated signal output from modulation section 109 is converted by frequency conversion section 154. Then, the frequency-modulated signal is sent to transmission section 112 and transmitted from antenna 113.

In the case of the incoming calling system of the second embodiment, incoming notification signal receivers 26 and 27 for receiving an incoming notification signal sent from incoming notification signal transmitter 24 are further formed in separate cases.

FIG. 16 is a circuit block diagram of wrist-type incoming notification signal receiver 27 of the second embodiment.

Though the structure of incoming notification signal receiver 27 shown in FIG. 16 is almost the same as that of the first embodiment (see FIG. 10), receiver 27 is characterized in that frequency setting section 161 is included in addition to the structure of the first embodiment in FIG. 10.

Therefore, radio waves of the incoming notification signal whose frequency is converted to a predetermined frequency by incoming notification signal transmitter 24 are received by antenna 121 and amplified by amplifier 122.

Frequency conversion section 123 in FIG. 16 performs frequency conversion in accordance with an oscillation frequency generated by local oscillator 124. In this case, the second embodiment is characterized in that frequency setting section 161 is included so that the oscillation frequency generated by local oscillator 124 can optionally be set. Specifically, by operating operation input section 135 of card-type incoming notification signal receiver 26 or wrist-type incoming notification signal receiver 27 shown in FIG. 13 or 14, a frequency set to frequency setting section 161 is changed to a desired frequency. Local oscillator 124 performs oscillation in accordance with a frequency set to frequency setting section 161 and frequency conversion section 123 performs frequency conversion in accordance with an oscillation frequency sent from local oscillator 124.

A frequency set to frequency setting section 161 is set so as to be equal to a frequency set by frequency setting section 151 (152) of incoming notification signal transmitter 24. Thereby, an incoming notification signal is securely transmitted or received. Moreover, when radio waves at the same frequency are used nearby, it is possible to easily prevent radio interference by changing the set frequencies of the transmission side and the reception side to other frequency bands at the same time.

The incoming signal frequency-converted by frequency conversion section 123 is amplified by amplifier 126 through band-pass filter 125 and demodulated by demodulation section 127.

When the demodulated incoming notification signal is input to control circuit 128, notification is applied to notification control section 129 by the fact that control circuit 128 determines that incoming is received by portable telephone 21 provided with incoming notification signal transmitter 24 and generates vibration alarm by driving motor 131 with a weight eccentrically added by running driver 130 or generates buzzer sound by driving speaker 133 by sound notification driver 132.

Power supply changeover switch 134 supplies driving power to running driver 130 and sound notification driver 132. When notification control section 129 makes either driver selectively perform notification, it switches power supply changeover switch 134 to supply power to purposed driver 130 or 132 from power supply VCC.

Operation input section 135 shown in FIG. 16 performs not only input operations for the above incoming notification but also input operations for alarm setting and time setting about clock functions. Clock functions (136 to 140) of incoming notification signal receiver 27 in FIG. 16 and structures and operations of display selection section 141 and LCD 142 are same as those in FIG. 10. Therefore, their description is omitted.

As described above, the incoming calling system of the second embodiment is constituted so that frequencies for transferring an incoming notification signal between incoming notification signal transmitter 24 and incoming notification signal receivers 26 and 27 constituted with a case different from that of transmitter 24 can properly be changed in accordance with the situation. Therefore, even if same-type incoming calling systems or radio equipment using the same frequency are used nearby, the probability of radio interference or erroneous notification can greatly be decreased only by changing frequencies of transmission or reception radio waves and therefore, more accurate incoming notification can be performed.

Moreover, the incoming calling system of the second is constituted by using a local oscillator comprising a VCO (voltage control oscillator). Therefore, the system can be mounted more inexpensively and more compactly. Thus, it is possible to constitute a high-reliability incoming calling system by incorporating the system into a portable compact electronic unit such as a wrist watch or electronic calculator.

The third embodiment is obtained by forming various structures shown in the above drawings into those in FIGS. 17 to 22, which is described below in detail by referring to the accompanying drawings. In FIGS. 17 to 22 showing the third embodiment, a symbol same as that in the drawings described for the first and second embodiments denotes the same section or equivalent section and its description is omitted.

The first embodiment prevents radio interference by converting an incoming notification signal to be transferred between incoming notification signal transmitter 24 and card-type incoming notification signal receiver 26 or wrist-type incoming notification signal receiver 27 by radio waves to a digital code comprising "1, 0, 1, 1" and making the code of other transmitter-receiver different from the digital code. However, the third embodiment is constituted so that a user can set an identification code comprising digital symbols such as "1", "0", "mark", and "space" or the above set identification code is included in a part of an incoming notification signal.

Thereby, even if same-type incoming calling systems or a unit using radio waves at the same frequency for other purpose are used nearby, radio interference with other radio signals is prevented, the probability of erroneous notification is decreased, and accurate and reliable incoming notification can be performed only by performing coincidence detection on an optionally-set digital code including the identification code because the identification code comprising the optionally set digital code is included in at least a part of an incoming notification signal to be transmitted or received.

FIGS. 17A and 17B are full views of incoming notification signal transmitter 24 of the third embodiment. In the case of incoming notification signal transmitter 24, jack 101 is protruded similarly to the case of the first embodiment and transmitter 24 is used by inserting jack 101 into earphone-microphone terminal 23 of portable telephone 21 shown in FIG. 1.

Incoming notification signal transmitter 24 shown in FIG. 17A is characterized in that it is provided with sliding-type code changeover switch 171. By sliding the switch in any arrow direction and optionally selecting any one of four types of identification codes from 1 to 4, an incoming notification signal including a selected identification code in at least a part of the signal is generated and the signal can be transmitted by radio waves. For example, code 1 is digital data "0, 0, 0, 0", code 2 is "0, 0, 1, 1", code 3 is "1, 0, 0, 0", and code 4 is "1, 1, 1, 1". FIG. 17A shows a case of selecting code 2.

Incoming notification signal transmitter 24 in FIG. 17B is characterized in that it is provided with code setting dials 172. Only by turning each code dial in any arrow direction, it is possible to optionally set four identification codes such as codes 1, 2, 3, and 4. An incoming notification signal including the set identification codes in at least a part of the signal is generated and radio-transmitted. That is, for the above case, 16-bit digital data of "0, 0, 0, 0, 0, 0, 1, 1, 1, 0, 0, 0, 1, 1, 1, 1" is output.

FIG. 18 is a full view of pen-type incoming notification signal receiver 181 of the third embodiment.

When pen-type incoming notification signal receiver 181 shown in FIG. 18 receives an incoming notification signal radio-transmitted from incoming notification signal transmitter 24 in FIG. 17A or 17B, it performs incoming notification by vibration. Pen-type incoming notification signal receiver 181 has built-in motor 131 with a weight eccentrically added to the rotary shaft. When an incoming notification signal is received, motor 131 is driven and the whole of the receiver vibrates. Therefore, it is possible to notify incoming to a person having the pen on his breast pocket.

Pen-type incoming notification signal receiver 26 in FIG. 18 is characterized in that it has code changeover switch 182 on its barrel. It is possible to optionally select four types of identification codes from 1 to 4 by sliding the switch in any arrow direction. When the receiver receives an incoming notification signal including a selected identification code in at least a part of the signal, it performs coincidence detection on the identification code. only when the identification code coincides, the receiver drives motor 131 and notifies the user of incoming by vibration. In this case, code 2 is selected and the content of the selected identification code is "0, 0, 1, 1".

When card-type incoming notification signal receiver 26 shown in FIG. 19 receives an incoming notification signal including a predetermined identification code radio-transmitted from incoming notification signal transmitter 24 in FIG. 17A or 17B, it performs incoming notification by vibration or buzzer sound. Card-type incoming notification signal receiver 26 has a built-in motor 131 with a weight eccentrically added to the rotary shaft. When receiver 26 receives an incoming notification signal, it drives motor 13 to vibrate the whole of the receiver. Therefore, the user can recognize incoming to a portable telephone only by having the receiver in his pocket.

Card-type incoming notification signal receiver 26 in FIG. 19 is characterized in that an identification code can optionally be selected by the numerical keys of operation input section 135. As shown in FIG. 19, card-type incoming notification signal receiver 26 allows the user to display an identification code to be set (e.g. 1234) on LCD 142 by setting the identification code setting mode and inputting a desired identification code by numerical keys and set the displayed identification code by pressing the setting key.

Moreover, when card-type incoming notification signal receiver 26 receives an incoming notification signal including an identification code in at least a part of the signal, it performs coincidence detection on the identification code and notifies the user of incoming by vibration by driving motor 131 only when the identification code included in the signal coincides with the set identification code.

FIG. 20 is a full view of wrist-type incoming notification signal receiver 27 of the third embodiment.

When wrist-type incoming notification signal receiver 27 shown in FIG. 20 receives an incoming notification signal radio-transmitted from incoming notification signal transmitter 24, it performs incoming notification by vibration or buzzer sound. Wrist-type incoming notification signal receiver 27 has a built-in motor 131 with a weight eccentrically added to the rotary shaft. When the receiver 27 receives an incoming notification signal radio-transmitted from the incoming notification signal receiver, it drives motor 131 to vibrate the whole of the receiver and notifies incoming to a person with the receiver 27 set on his arm.

Wrist-type incoming notification signal receiver 27 in FIG. 20 is characterized in that a desired identification code can be selected by the input key of operation input section 135. As shown in FIG. 20, wrist-type incoming notification signal receiver 27 allows the user to set an identification code (e.g. 1234) displayed on LCD 142 by setting the identification cod setting mode, repeatedly pressing the input key until a desired identification code is displayed, and displaying and deciding the identification code to be set.

FIG. 21 is a circuit block diagram of incoming notification signal transmitter 24 of the third embodiment.

Though incoming notification signal transmitter 24 shown in FIG. 21 has a structure almost same as that of the first embodiment (see FIG. 8), it is characterized in that code setting input section 191, code memory 192, and P/S (parallel/serial) conversion section 193 are included in addition to the structure of the first embodiment in FIG. 8.

Therefore, when portable telephone 21 receives an incoming call, an incoming tone is normally output from built-in speaker 37. However, because jack 101 of incoming notification signal transmitter 24 is connected to earphone-microphone terminal 23, the incoming tone is not output to speaker 37 but the speech signal of the incoming tone is input through jack 101.

The input speech signal of the incoming tone is amplified by amplifier 102, and only speech signals in a predetermined frequency band are fetched by band-pass filter 103, wave-detected by wave detector 104, and waveform-shaped by waveform shaping section 105.

Then, latch circuit 106 is set by the waveform-shaped rectangular waves and moreover a timer circuit 107 is operated so as to radio-transmit incoming notification signals only for a certain time. That is, the signals set to latch circuit 106 are output to incoming notification signal generation section 108 until a reset signal is input from timer circuit 107.

In the case of the third embodiment, a desired identification code is generated by newly-added code setting input section 191, code memory 192, and P/S conversion section 193, and an incoming notification signal including the identification code is generated when an incoming notification signal is generated by incoming notification signal generation section 108 and output to modulation section 109 at the next stage.

Moreover, a predetermined oscillation frequency is input to frequency multiplication section 111 from oscillator 110 and carrier waves generated by the section 111 are output to modulation section 109. Then, modulation section 109 modulates the incoming notification signal including an identification code generated by incoming notification signal generation section 108 with the carrier waves. The modulated signal is sent to transmission section 112 and transmitted from antenna 113.

For the incoming calling system of the third embodiment, incoming notification signal receiver 26, 27, or 181 for receiving an incoming notification signal transmitted from incoming notification signal transmitter 24 is formed in a separate case.

FIG. 22 is a circuit block diagram of wrist-type incoming notification signal receiver 27 of the third embodiment.

Though incoming notification signal receiver 27 in FIG. 22 has a structure almost the same as that of the first embodiment (see FIG. 10), it is characterized in that demodulation section 201, reception code register 202, identification code collation circuit 203, and code memory 204 are added between demodulation section 127, control circuit 128, and notification control section 129 constituted in FIG. 10.

Therefore, radio waves of the incoming notification signal including an identification code transmitted from incoming notification signal transmitter 24 are received by antenna 121 and amplified by amplifier 122.

Frequency conversion section 123 in FIG. 22 performs frequency conversion in accordance with an oscillation frequency generated by local oscillator 124.

The incoming signal frequency-converted by frequency conversion section 123 is amplified by amplifier 126 through band-pass filter 125 and demodulated by demodulation section 127.

The third embodiment is characterized in that the incoming notification signal including an identification code demodulated by demodulation section 127 is decoded to a digital code string of "1" and "0" by decoding section 201 and output to identification code collation circuit 203 through reception code register 202.

Moreover, in incoming notification signal receiver 27, the same identification code as that previously set by incoming notification signal transmitter 24 is set by operation input section 135, whereby control circuit 128 stores the identification code in code memory 204. Therefore, identification code collation circuit 203 collates the identification code included in the received incoming notification signal with the identification code stored in code memory 204 to perform coincidence detection on whether the identification codes coincide each other. Only when they coincide each other, notification control section 129 controls driver 130 to rotate motor 131 on which an eccentric weight is mounted and generate a vibration alarm, drives sound notification driver 132 to energize speaker 133 and generate buzzer sound, or controls light emitting driver 205 to turn on light emitting diode 206.

Because the clock functions (136 to 140) of incoming notification signal receiver 27 in FIG. 22 and structures and operations of display selection section 141 and LCD 142 are the same as those of the first embodiment in FIG. 10, their description is omitted.

As described above, the incoming calling system of the third embodiment is constituted so as to perform incoming notification only when identification codes of transmission side and reception side coincide each other by performing coincidence detection on a predetermined identification code included in an incoming notification signal to be transferred between incoming notification signal transmitter 24 and incoming notification signal receivers 26, 27, and 181 formed in a case different from the case of transmitter 24. Therefore, even if same-type incoming calling systems or a radio unit using the same frequency are used nearby, the probability of radio interference or erroneous notification is greatly decreased and more reliable incoming notification can be performed.

Moreover, because the incoming calling system of the third embodiment comprises a local oscillator using a VCO (voltage control oscillator) and a code digital memory, it can be mounted more inexpensively and compactly. Therefore, it is possible to constitute a high-reliability incoming calling system by incorporating the incoming calling system into a portable compact electronic unit such as a wrist watch or electronic calculator, Moreover, it is possible to constitute the incoming calling system so that an incoming notification signal to be transmitted or received by radio waves is constructed by, for example, digital codes showing "1" and "0" or "mark" and "space" and the string of the codes can be set by the transmission and reception sides so as to be used as identification codes, and notification is performed only when the identification codes coincide each other.

There will now be described the fourth embodiment for providing a wrist-watch-type incoming calling system which notifies the user that incoming is received by an PHS slave unit used for a PHS (Personal Handyphone System) when speech is performed by the PHS is described as an example.

FIG. 23 shows a system for incoming calling of a PHS cordless telephone.

The system structure shown in FIG. 23 comprises telephone set 211, public switched telephone network 212, ISDN 213, PHS base station 214, PHS slave unit 215, and wrist-type incoming notification unit 216. ISDN 213 further includes PHS service control station 217, subscriber data base 218, and position entry data base 219.

First, in FIG. 23, PHS slave unit 215 regularly automatically enters the position of the present place (that is, PHS base station 214 nearest to the present place) in the position entry data base connected to PHS service control station 217 through PHS base station 214 as shown by the broken-line arrow in FIG. 23.

When telephone set 211 at the sender side performs calling as shown by 1 in FIG. 23, 2 incoming calling is performed for PHS base station 214 nearest to position-entered PHS slave unit 215 from ISDN 213 serving as a digital network through subscriber telephone network 212 such as PSTN. Then, 3 PHS base station 214 transmits an incoming call signal to PHS slave unit 215 by radio waves.

4 When PHS slave unit 215 receives the incoming call signal, it transmits a link channel establishment request signal for establishing an incoming link channel to PHS base station 214 by radio waves as a response.

In the case of the fourth embodiment, a link channel establishment request signal transmitted by PHS slave unit 215 receiving an incoming call signal in 4 is also received by wrist-type incoming notification unit 216 of a person having PHS slave unit 215.

5 Wrist-type incoming notification unit 216 selectively receives radio waves of a response signal in 190 MHz (1.9 GHz) band to be transmitted correspondingly to an incoming calling received by PHS slave unit 215 like a received link channel establishment request signal and detects if the received signal conforms to a predetermined signal format. If so, unit 216 generates vibration or alarm sound to notify the user that PHS slave unit 215 receives incoming. The above response signal is not restricted to a link channel establishment request signal. It is also possible to use a signal for detecting a synchronous burst signal or incoming call response signal.

Wrist-type incoming notification unit 216 in FIG. 23 is constituted as shown in FIG. 24.

FIG. 24 is a circuit block diagram of wrist-type incoming notification unit 216 of the fourth embodiment.

Wrist-type incoming notification unit 216 is characterized in that a normal wrist watch is provided with antenna 221, reception circuit 222, and signal detection section 223 and when a response signal transmitted from PHS slave unit 216 is detected by signal detection section 223, the unit 216 sends a signal to notification control section 224 to flicker the light of a photoemissive element such as LED or EL (Electroluminescence), output alarm sound from a sound element, or notify the incoming to PHS slave unit 216 by separate-case wrist-type incoming notification unit 216 by performing vibrator call by a vibration element.

A PHS cordless telephone system transmits or receives data by performing *¼-shift QPSK multiple-value position modulation for radio waves of an ultra-high frequency (UHF) band of a semi-microwave band specified with 300 KHz (0.3 MHz) interval of 1895.150 (MHz) to 1917.050 (MHz) bands by using digital signals between a base station and a PHS master unit, between a base station and a PHS slave unit, between a PHS master unit and a PHS slave unit, or between PHS slave units.

Moreover, a control signal channel or communication channel for performing the above communication uses a multiplexed transmission channel according to the time-division multi-carrier 4-TDMA (Time Division Multiple Access) system and the TDD (Time Division Duplex) system serving as a transmission system.

Any one of the above four-divided time slots (approx. 625 μsec) is assigned and a control signal or communication channel is transmitted or received for each time slot.

For example, in the case of an incoming sequence, a control signal for an incoming call signal (PCH) is sent from a base station and thereafter, the incoming terminal side (e.g. PHS slave unit) transmits a control signal for a link channel establishment request signal (SCCH) in order to respond to the former control signal.

In the case of the incoming call signal (PCH), channel identification (CI), originating identification code, incoming call signal (PCH) data string, and error detection code (CRC) are sent as a set after a preamble (PR).

Moreover, in the case of the link channel establishment request signal (SCCH), an originating identification code, terminating identification code, link channel establishment request signal (SCCH) data string, and error detection code (CRC) are sent after a preamble (PR) and channel identification (CI). The originating identification code includes the calling code of its own station and the terminating identification code includes the calling code of the other-side station.

In the case of the fourth embodiment, reception circuit 222 shown in FIG. 24 receives and wave-detects (demodulates) radio waves of the 1900-MHz (1.9-GHz) band for the above PHS slave unit to receive incoming calling and transmit a response signal.

Then, signal detection section 223 detects whether the reception signal demodulated by reception circuit 222 conforms to the signal format of a predetermined modulation system (e.g. π/4-shift QPSK). When the reception signal conforms to the signal format of the predetermined modulation system, signal detection section 223 in a wrist watch sends a signal to notification control circuit 224 for notification by alarm sound or the like, drives sound element 226 for alarm notification, drives photoemissive element 225 for notification by light, or drives vibration element 227 for notification by vibration.

Operation input section 228 shown in FIG. 24 performs input operations for performing alarm setting or time setting about clock functions of a wrist watch.

Then, clocks at a predetermined frequency are output from oscillator 229 to frequency dividing circuit 230 and time measuring section 231 measures the present time in accordance with frequency-divided clocks.

Moreover, to use alarm functions, an alarm time is previously set to alarm time circuit 232 and it is monitored whether the present time data sent from time measuring section 231 coincides with the alarm time data set to alarm time circuit 232 by alarm coincidence circuit 233. When both data coincide each other, alarm coincidence circuit 233 directs notification control section 224 to perform notification by vibration, alarm sound, or light.

Furthermore, display control section 234 properly selects data to be displayed such as alarm set time, present time, or whether the above incoming notification is performed so as to display the data on display section 235.

As described above, in the case of the incoming calling system of the fourth embodiment, when a wrist watch always closely attached to the user's arm is used and incoming calling is sent to a portable telephone terminal such as a PHS slave unit from a base station, the wrist watch receives radio waves of a link channel establishment request signal to be transmitted from the PHS slave unit in response to the incoming calling from the base station (reception circuit). In this time, the wrist watch is identified whether the received signal is a signal transmitted from the PHS slave unit in response to the incoming calling (signal detection section). When the wrist watch identifies the incoming calling, the incoming is notified to the user by light, sound, or vibration (notification section).

Therefore, when incoming reaches a portable telephone terminal such as a PHS slave unit put in a suitcase or the like, it is possible to immediately and securely recognize the incoming by the wrist watch also serving as the incoming calling system.

When an incoming tone of the portable telephone terminal side is turned off or the vibration mode is set, the user may not be conscious of incoming unless he wears the portable telephone terminal. However, in the case of this embodiment, it is possible to securely recognize incoming by vibration or alarm sound of a wrist watch. Particularly, by setting the wrist watch to the vibration mode, the user can securely recognize incoming and answer the phone without disturbing others. Therefore, he does not have to wear a portable telephone terminal or be anxious about others and thereby, he can freely use a portable telephone.

The fourth embodiment uses the system of notifying the user of incoming by using a PHS-slave-unit-type digital cordless telephone and receiving a link channel establishment request signal transmitted by responding to incoming calling. However, it is also possible to use other communication system or detect other response signal. Moreover, it is possible to a system of receiving radio waves of a portable telephone using other frequency band. For example, a 800-MHz analog portable telephone and 800 MHz- or 1.5 GHz-band digital portable telephone are examples of the portable telephone using other frequency band.

Moreover, the above embodiments perform notification by selectively driving a photoemissive element, sound element, or vibration element in an alternative way. However, it is also possible to perform notification by freely combining and simultaneously driving these notification elements. Moreover, it is possible to use an LED or EL as the photoemissive element or freely change methods for turning on or flickering the notification element. Furthermore, it is possible to use various types of sound elements or vibrating elements.

FIG. 25 shows a system block diagram using the incoming calling system of the fifth embodiment.

The system structure shown in FIG. 25 comprises telephone set 241, subscriber telephone network 242, ISDN 243, subscriber telephone network 244, PHS base station 245, PHS master unit 246, PHS slave unit 247, and wrist-type incoming notification units 248 and 249. ISDN 243 further includes service control station 250, subscriber data base 251, and position entry data base 252.

First, in FIG. 25, 1, 1' wrist-type incoming notification units 248 and 249 respectively store peculiar ID identification code data and radio-transmit peculiar ID identification code data and a position entry request signal to nearby PHS master unit 246 or PHS slave unit 247. 2, 2' PHS master unit 246 or PHS slave unit 247 receiving the ID identification code data and position entry request signal stores the received ID identification code data in its own memory, sends it to subscriber telephone network 244 or PHS base station 245, and enters the position of PHS master unit 246 or PHS slave unit 247 receiving the position entry request signal as shown by a broken line in FIG. 25.

Moreover, as shown by 3 in FIG. 25, when telephone set 241 transmits call to PHS master unit 246, incoming call is sent to position-entered PHS master unit 246 from 4 subscriber telephone network 244 through subscriber telephone network 242 such as PSTN and ISDN 243 serving as a digital network. Thereby, 5 PHS master unit 246 radio-transmits the ID identification code data stored in its own memory to wrist-type incoming notification unit 248. When received data is the same as the ID identification code data of its own, wrist-type incoming notification unit 248 generates alarm sound or vibration by assuming the reception as incoming notification and notifies incoming to PHS master unit 246.

Moreover, when 3 telephone set 241 transmits call to PHS slave unit 247, incoming call is sent to position-entered PHS slave unit 247 from 4' PHS base station 245 through ISDN 243 serving as a digital network. Thereby, 5' PHS slave unit 247 radio-transmits incoming notification to wrist-type incoming notification unit 249 similarly to the case of PHS master unit 246 and wrist-type incoming notification unit 249 receives the incoming notification and notifies incoming to PHS slave unit 247 by alarm sound or vibration.

PHS slave unit 247 shown in FIG. 25 is constituted as shown in FIG. 26.

[PHS slave unit]

FIG. 26 is a block diagram of PHS slave unit 247 in FIG. 25.

In FIG. 26, PHS slave unit 247 comprises antenna 261, high frequency section 262, modem 263, channel link control section 264 including an incoming-tone generation circuit, sound CODEC 265, audio interface 266, speaker 267, microphone 268, RAM 269, ID memory 270, control circuit 271, LCD 272, keyboard 273, encoding section 274, modulation section 275, transmission/reception section 271, decoding section 277, demodulation section 278, and antenna 279. Moreover, high frequency section 262 comprises SW 280, reception section 281, transmission section 282, and PLL synthesizer 283.

Antenna 261 transmits and receives a transmission signal and reception signal including a control signal and speech signal at a predetermined frequency band. In other words, antenna 261 transmits the transmission signal from high frequency section 262 through SW 280 and outputs the reception signal to SW 280. A public communication network to be connected to PHS base station 245 can use PSTN (Public Switched Telephone Network) or ISDN (Integrated Service Digital Network).

PLL synthesizer 283 locally oscillates in accordance with a frequency set by control circuit 271 and outputs a local-oscillation signal for frequency conversion in reception section 281 and transmission section 282 to reception section 281 and transmission section 282.

Reception section 281 of high frequency section 262 has, for example, a two-stage mixer, and frequency-converts a reception signal input by being received by antenna 261 and distributed by SW 280 to an IF signal by mixing the signal with a local-oscillation signal input from PLL synthesizer 283 and outputs the mixed signal to modem 263.

Transmission section 282 of high frequency section 262 frequency-converts modulated waves of $\pi/4$-shift QPSK input from modem 263 by a mixer and transmits the frequency-converted modulated waves from antenna 261.

Modem 263 comprises not-illustrated, for example, S/P (Serial to Parallel) conversion circuit, a differential encoder, a signal mapping circuit, a Nyquist filter, and an orthogonal modulator and performs modulation/demodulation of $\pi/4$-shift QPSK. That is, modem 263 is provided with demodulation section 263A at its reception side, demodulates an IF signal input from reception section 281 and separates it as IQ data, and outputs it to channel link control section 264 as a data string. Moreover, modem 263 is provided with D/A conversion circuit 263B and modulation section 263C at its transmission side, generates IQ data from a data string input from channel link control section 264, and applies $\pi/4$ QPSK modulation to the data string to output it to transmission section 282 of high frequency section 262.

Channel link control section 264 transmits a control signal by a control channel secured through time division and moreover performs frame synchronization and slot formatting.

That is, the reception side of channel link control section 264 fetches a slot from data (frame) sent from modem 263 at a predetermined timing, releases the wiretapping prevention scramble, and thereafter fetches component data from the format of the slot.

Moreover, on the reception side of channel link control section 264, control data within the fetched component data is sent to control circuit 271 and ADPCM (Adaptive Differential PCM) sound data is transferred to sound CODEC 265.

Moreover, the transmission side of channel link control section 264 adds control data to sound data transferred from sound CODEC 265 to generate a slot and applies scramble to the slot and thereafter, inserts the slot into a frame at a predetermined timing and outputs it to modem 263.

Sound CODEC 265 performs compression and extension of digital sound data. Specifically, it performs encoding and decoding of digital sound data by the ADPCM system using adaptive prediction and adaptive quantization.

That is, sound CODEC 265 is provided with decoding circuit 265A on its reception side and extends ADPCM sound data sent from channel link control section 264 by decoding the data as a PCM speech signal and outputs it to audio interface 266.

Moreover, sound CODEC 265 is provided with encoding circuit 265B at its transmission side, compresses a PCM speech signal input from audio interface 266 by encoding the signal as ADPCM sound data, and outputs it to channel link control section 264.

Audio interface 266 performs analog-digital conversion of a speech signal and controls speech volume and incoming tone volume.

That is, on the reception side of audio interface 266, a PCM speech signal sent from sound CODEC 265 is converted to an analog speech signal and is loudly output from speaker 267. Moreover, on the transmission side of audio interface 266, an analog speech signal input from microphone 268 is converted to a digital speech signal and is output to sound CODEC 265 as a PCM speech signal.

Furthermore, audio interface 266 drives speaker 267 to output an incoming tone (ringing tone) under the control of control circuit 271 to be mentioned later and notifies that incoming call is received.

Control circuit 271 is provided with a CPU (Central Processing Unit), uses RAM (Random Access Memory) 269 as a work memory in accordance with a program stored in a ROM (Read Only Memory), and performs a series of processing according to a communication protocol in PHS slave unit 247, i.e., communication control processing in accordance with a communication control program, driving of speaker 267 to notify with ringing tone that incoming call is received, and collation of an ID Code (ID identification code data) included in a reception signal with an ID code stored in ID memory 270 and transmission of the ID code as an incoming call response signal by determining that the incoming call is sent to its own terminal when the both ID codes coincide each other.

LCD 272 is a liquid crystal display to display various pieces of information to be notified to the user from PHS slave unit 247.

Keyboard 273 comprises various keys such as numerical keys, an asterisk key, a holding key, and a speech key and allows the user to input necessary information by using these keys. When keyboard 273 is operated, control circuit 271 controls various sections of PHS slave unit 274 so that processing corresponding to a pressed key of keyboard 273 is performed.

The fifth embodiment is characterized in that it is provided with a wireless data transmission/reception interface (so-called a data carrier interface) for transferring data to and from an external unit such as an IC card or a wrist watch by wireless through radio waves, electromagnetic induction, or electrostatic induction at its PHS slave unit 247 side in addition to the functions of the above PHS telephone terminal.

The data carrier interface in FIG. 26 comprises encoding section 274 for transmitting the above ID code, modulation section 275, transmission section 276, decoding section 277, antenna 279, and demodulation section 278 for demodulating a reception signal sent through antenna 279. Antenna 279 receives an position entry request signal and an ID code (ID identification code) from wrist-type incoming notification unit 249 shown in FIG. 25. When receiving the signal and the ID code, control circuit 271 stores the received ID code in ID memory 270 and outputs the position entry request signal from antenna 261. Moreover, antenna 279 transmits an incoming notification signal to wrist-type incoming notification unit 249.

FIG. 27 is a block diagram showing the structure of wrist-type incoming notification unit 249 provided with a data carrier interface same as that of PHS slave unit 247.

The data carrier interface of wrist-type incoming notification unit 249 in FIG. 27 comprises antenna 281, transmission/reception section 282, demodulation section 283, decoding section 284, modulation section 285, and encoding section 286, and receives an ID code from PHS slave unit 247 shown in FIG. 26 as an incoming notification signal and transmits a position entry request signal and an ID code (ID identification code) stored in ID memory 287 to be mentioned later to PHS slave unit 247.

Moreover, wrist-type incoming notification unit 249 is provided with ID memory 287 for storing the ID code peculiar to the notification unit 249 and notifies incoming from incoming detection section 300 to notification control section 288 when an ID code received by control circuit 299 is collated with an ID code in ID memory 287 and the both ID codes coincide each other. Notification control section 288 drives sound element 289 or vibration element 290 to generate alarm sound or vibration for notification. Incoming notification by wrist-type incoming notification unit 249 is performed only when incoming reaches PHS slave unit 247 requesting position entry.

Because symbols 291 to 298 in FIG. 27 have the same structure as the wrist watch of wrist-type incoming notification unit 216 in FIG. 24, their description is omitted.

Then, operations are described below.

First, as shown in FIG. 25, 1' wrist-type incoming notification unit 249 transmits the ID code (ID identification code) of its own and a position entry request signal to PHS slave unit 247 which is a nearby telephone terminal by a data carrier interface.

When PHS slave unit 247 receives the ID code and position entry request signal from wrist-type incoming notification unit 249 by the data carrier interface, 2' it stores the ID code in ID memory 270 and moreover, automatically enter the position in the position entry data base connected to the service control station of ISDN 243 through PHS base station 245.

In this case, 3 when calling is performed in order to call the user of wrist-type incoming notification unit 249 from telephone set 241, ID identification codes in position entry data base 252 of ISDN 243 are referenced through subscriber telephone network 242. Radio-telephone service control station 250 automatically outputs an incoming call signal for the incoming telephone to the ID identification code through PHS base station 245.

4' when incoming call reaches PHS slave unit 247 from PHS base station 245, 5' PHS slave unit 247 transmits an ID code stored in ID memory 270 to wrist-type incoming notification unit 249 as an incoming notification signal by a data carrier interface. When wrist-type incoming notification unit 249 receives the incoming notification signal, it compared the ID code of the received signal with the ID code stored in its ID memory 287. When the both ID codes coincide each other, the unit 249 can notify the user of wrist-type incoming notification unit 249 that a telephone call addressed to the unit 249 reaches PHS slave unit 247 by controlling the notification control section through incoming detection section 300 and thereby driving sound element 289 or vibration element 290.

As described above, in the case of the fifth embodiment, an ID memory for storing an private ID identification code and a wireless data transmission/reception interface (data carrier interface) for transferring data to and from a nearby telephone terminal are provided for a wrist-type incoming notification unit on the both sides. Therefore, by transmitting the private ID identification code to a nearby telephone terminal, it is possible to easily enter the position in the position entry data base of a radio-telephone service control station and moreover, recognize incoming.

Therefore, a telephone call addressed to his own can be received by using a nearby telephone terminal without always carrying a large inconvenient-to-carry radiotelephone terminal and moreover, the user can recognize whether incoming is addressed to him or not by the incoming notification function of a wrist-type incoming notification unit.

Even if an ID identification code of a telephone terminal does not correspond to a private ID identification code, it is possible to securely detect and notify only the telephone incoming addressed to the private ID requesting position entry.

Moreover, an addresser can call a special other party similarly to paging transmission only by performing general telephone transmission instead of calling a desired other party and moreover, he has the advantage that paging contract and paging charge are unnecessary.

In the case of the fifth embodiment, an ID identification code is transmitted from a wrist-type incoming notification unit using a PHS digital cordless telephone and a wireless data transmission/reception interface using feeble radio waves (data carrier interface) at a distance relatively close to the PHS digital cordless telephone to perform position entry and terminal entry. However, it is also possible to perform position entry only on the radiotelephone terminal side only by transmitting a private ID identification code and receiving an incoming notification signal on the wrist-type incoming notification unit side.

Moreover, it is possible to transmit an incoming notification signal transmitted from the radiotelephone terminal side to the wrist-type incoming notification unit side together with a caller identification code, and receive and notify the incoming notification signal at the wrist-type incoming notification unit side and also display the name of a caller previously entered in a memory on display section 298 in accordance with the caller identification code receiving a telephone call originated from a person.

Furthermore, though the above embodiments use wireless data transmission/reception unit using radio waves as transmission/reception unit of a signal between a radiotelephone terminal and a wrist-type incoming notification unit, it is also possible to use wireless data transmission/reception means using other medium such as electromagnetic induction, electrostatic induction, or infrared rays.

Furthermore, it is possible to use a radiotelephone of a future public mobile communication system such as other radiotelephone, portable telephone system, or FPLMTS (Future Public Land Mobile Telecommunication Systems) instead of a PHS cordless telephone.

Furthermore, though an incoming notification unit uses a wrist-type incoming notification unit, it is also possible to use a card-type or pen-type incoming notification unit.

As described above, any embodiment of the present invention makes it possible to securely recognize incoming even if a terminal is located at a remote place and moreover, has the advantage that incoming to any embodiment is not confused with that to other terminal.

That is, because an incoming notification signal transmitter and an incoming notification signal receiver are constituted with a separate case respectively, it is possible to recognize incoming by having only a compact incoming notification signal receiver even if he does not always carry a telephone terminal, securely detect incoming to a terminal because the incoming notification signal transmitter is directly connected to the terminal, and perform secure incoming notification free from erroneous notification because an incoming notification signal is transmitted and notified to the incoming notification signal receiver in accordance with the incoming detection.

I claim:

1. An incoming calling system having an incoming notification function for detecting incoming of a portable telephone terminal nearby a wrist watch having a time display function and to be attached to the user's arm so as to notify the user of the incoming;

wherein said wrist watch comprises:
reception means for receiving an incoming calling signal for the incoming to said portable telephone terminal from a base station of a radiotelephone or a master unit of a telephone terminal or an incoming response signal to be transmitted to the base station of said radiotelephone or said master unit of said telephone terminal;
signal decision means for deciding whether the signal received by said reception means is a signal which is of a specific frequency band used by said portable telephone terminal (i) for detecting incoming at the time of incoming, and (ii) for the communication system used by said portable telephone terminal to recognize an incoming request for said portable telephone terminal; and
notification means for notifying the user of said wrist watch by vibration or sound when it is decided by said signal decision means that an incoming request is sent to a portable telephone terminal nearby said wrist watch.

2. The incoming calling system according to claim 1, wherein said notification means includes a weight rotational motor built in said wrist watch to produce vibration.

3. The incoming calling system according to claim 1, further comprising an alarm section for driving said notification means to produce vibration or sound when a current time coincides with a preset alarm time.

4. The incoming calling system according to claim 3, wherein said alarm section comprises:
an alarm time circuit for presetting the alarm time;
an alarm coincidence circuit for monitoring whether the current time coincides with the alarm time; and
a notification control section for controlling said notification means when the current time coincides with the preset alarm time.

5. An incoming calling system for notifying an incoming call for a telephone terminal of a small-zone-type telephone system whose position can be entered in a position entry data base by means of an incoming notification unit whose case is separate from that of said telephone terminal, wherein said telephone terminal comprises:
wireless reception means for receiving an identification code sent from said incoming notification unit by wireless transmission;
position entry means for entering a position in said position entry data base in accordance with said received identification code;
identification code storage means for storing said received identification code; and
wireless transmission means for transmitting an identification code stored in said identification code storage means by wireless transmission; and wherein said incoming notification unit includes:

wireless transmission means for transmitting at least the identification code of its own to said telephone terminal by wireless transmission;

wireless reception means for receiving said identification code sent from said telephone terminal by wireless transmission; and notification means for notifying that said identification code is received by said reception means of said incoming notification unit.

6. The incoming calling system according to claim 5, wherein said incoming notification unit is built in a wrist watch to be attached to the user's arm.

7. The incoming calling system according to claim 6, wherein said incoming notification unit includes means for notifying the user of said wrist watch by vibration or sound.

8. The incoming calling system according to claim 6, wherein said incoming notification unit includes a weight rotational motor built in said wrist watch to produce vibration.

9. The incoming calling system according to claim 6, wherein said incoming notification unit includes:

a code memory for storing the own identification code;

an identification code collation circuit for collating the received identification code with the own identification code stored in said code memory; and a notification control section for controlling said incoming notification unit when the received identification code and the own identification code coincide with each other.

10. The incoming calling system according to claim 9, wherein said incoming notification unit further includes means for receiving the identification code from said telephone terminal as an incoming notification signal and for transmitting a position entry request signal and the identification code stored in said code memory to said telephone terminal.

11. The incoming calling system according to claim 6, wherein said wireless reception means of said telephone terminal receives the identification code and position entry data from said incoming notification unit and transmits a position entry request signal.

* * * * *